(12) United States Patent
Porras et al.

(10) Patent No.: US 9,195,486 B2
(45) Date of Patent: Nov. 24, 2015

(54) OBSERVATION AND ANALYSIS BASED CODE OPTIMIZATION

(75) Inventors: Victor Leonel Hernandez Porras, San Francisco, CA (US); Christopher Arthur Lattner, San Jose, CA (US); Jia-Hong Chen, Cupertino, CA (US); Eric Marshall Christopher, Los Gatos, CA (US); Roger Scott Hoover, Cheyenne, WY (US); Francois Jouaux, Woodside, CA (US); Robert John McCall, San Francisco, CA (US); Thomas John O'Brien, San Jose, CA (US); Pratik Solanki, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 897 days.

(21) Appl. No.: 12/847,945

(22) Filed: Jul. 30, 2010

(65) Prior Publication Data
US 2012/0030661 A1    Feb. 2, 2012

(51) Int. Cl.
*G06F 9/45* (2006.01)
*G06F 9/455* (2006.01)
*G06F 11/30* (2006.01)

(52) U.S. Cl.
CPC .......... *G06F 9/45525* (2013.01); *G06F 8/4441* (2013.01); *G06F 11/30* (2013.01)

(58) Field of Classification Search
CPC .... G06F 9/45525; G06F 8/4441; G06F 11/30
See application file for complete search history.

(56) References Cited

U.S. PATENT DOCUMENTS

| | | | | |
|---|---|---|---|---|
| 5,857,104 A | * | 1/1999 | Natarjan et al. | 717/158 |
| 6,014,518 A | * | 1/2000 | Steensgaard | 717/154 |
| 6,077,313 A | * | 6/2000 | Ruf | 717/155 |
| 6,148,437 A | * | 11/2000 | Shah et al. | 717/128 |
| 6,195,793 B1 | | 2/2001 | Schmidt | |

(Continued)

OTHER PUBLICATIONS

Ross D. Shachter et al. "Decision Making Using Probabilistic Inference Methods", [Online], 1992, pp. 276-283, [Retrieved from Internet on Jul. 20, 2015] <http://arxiv.org/ftp/arxiv/papers/1303/1303.5428.pdf>.*

(Continued)

*Primary Examiner* — Thuy Dao
*Assistant Examiner* — Ziaul A Chowdhury
(74) *Attorney, Agent, or Firm* — Downey Brand LLP

(57) ABSTRACT

Observation and analysis based optimization of software code is disclosed. An expected value is chosen for a dynamic attribute that cannot be determined, prior to execution of the associated software code, to be guaranteed to have that expected value at runtime. An optimized version of the software code is generated, including one or more optimizations based on an assumption that the dynamic attribute will have the expected value. Non-exhaustive examples of a dynamic attribute include a variable type; a location in memory; a location in which a global object, property, or variable is stored; the contents of a global function or method; and a value of a global property or variable. A check is performed during execution of the optimized version of the software code, prior to executing the portion that has been optimized based on the assumption, to verify that the dynamic attribute has the expected value. In the event that it is determined at runtime that the dynamic attribute does not have the expected value, execution reverts to backup code that is not based on the assumption that dynamic attribute will have the expected value.

20 Claims, 19 Drawing Sheets

(56) References Cited

U.S. PATENT DOCUMENTS

| | | | |
|---|---|---|---|
| 6,223,340 B1 | 4/2001 | Detlefs | |
| 6,564,162 B1* | 5/2003 | Erskine | 702/120 |
| 6,658,656 B1* | 12/2003 | Thompson | 717/151 |
| 6,799,236 B1 | 9/2004 | Dice et al. | |
| 6,971,091 B1* | 11/2005 | Arnold et al. | 717/145 |
| 6,980,997 B1 | 12/2005 | Peschel-Gallee et al. | |
| 7,080,366 B2* | 7/2006 | Kramskoy et al. | 717/148 |
| 7,171,656 B2* | 1/2007 | Keim et al. | 717/148 |
| 7,426,725 B2 | 9/2008 | Moon et al. | |
| 7,594,189 B1* | 9/2009 | Walker et al. | 715/811 |
| 7,624,394 B1* | 11/2009 | Christopher, Jr. | 717/177 |
| 7,725,885 B1 | 5/2010 | Pradhan et al. | |
| 7,882,396 B2* | 2/2011 | Bolignano et al. | 714/37 |
| 8,291,383 B1 | 10/2012 | Evans | |
| 8,789,025 B2 | 7/2014 | O'Brien et al. | |
| 2003/0074602 A1* | 4/2003 | Lomet et al. | 714/15 |
| 2005/0071831 A1* | 3/2005 | Sheikh et al. | 717/151 |
| 2005/0188363 A1 | 8/2005 | Moon et al. | |
| 2006/0167950 A1* | 7/2006 | Vertes | 707/200 |
| 2006/0179036 A1* | 8/2006 | Broker | 707/3 |
| 2006/0265552 A1* | 11/2006 | Davis et al. | 711/137 |
| 2007/0006167 A1* | 1/2007 | Luk et al. | 717/130 |
| 2007/0074173 A1* | 3/2007 | Ferren et al. | 717/127 |
| 2007/0174695 A1 | 7/2007 | Varadarajan et al. | |
| 2007/0226066 A1* | 9/2007 | Brunner et al. | 705/26 |
| 2007/0250825 A1 | 10/2007 | Hicks et al. | |
| 2008/0016253 A1* | 1/2008 | Boctor | 709/250 |
| 2008/0127134 A1 | 5/2008 | Tirumalai et al. | |
| 2011/0225564 A1 | 9/2011 | Biswas et al. | |
| 2011/0307876 A1* | 12/2011 | Ottoni et al. | 717/153 |
| 2012/0030653 A1 | 2/2012 | Porras et al. | |
| 2012/0030659 A1 | 2/2012 | Porras et al. | |
| 2012/0311552 A1* | 12/2012 | Dinn | 717/154 |

OTHER PUBLICATIONS

Jiazhen Cai et al. "Type Analysis and Data Structure Selection", [Online], 1991, pp. 1-40, [Retrieved from Internet on Jul. 20, 2015], <http://www.diku.dk/hjemmesider/ansatte/henglein/papers/cai1991.pdf>.*

G.M. Bierman, "Formal Semantics and Analysis of Object Queries", [Obline], 2003, pp. 407-418, [Retrieved from Internet on Jul. 20, 2015], <https://courses.cs.washington.edu/courses/cse591d/03sp/bierman.pdf>.*

Kuo-Chung Tai et al. "Debugging Concurrent Ada Programs by Deterministic Execution", [Online], 1991, pp. 45-63, [Retrieved from Internet on Jul. 20, 2015], <http://ieeexplore.ieee.org/stamp/stamp.jsp?tp=&arnumber=67578>.*

Stepanian et al., "Inlining Java native calls at runtime." VEE'05 (Jun. 11-12, 2005), Chicago, Ill.

Asher et al., "The effect of unrolling and inlining for Python bytecode optimizations." SYSTOR'09 (May 4-6, 2009), Haifa, Israel.

U.S. Appl. No. 12/847,904. Office Action dated Dec. 14, 2012.

U.S. Appl. No. 12/847,904. Notice of Allowance dated May 20, 2013.

U.S. Appl. No. 12/847,925. Office Action dated Jan. 29, 2013.

Arnold et al. Adaptive optimization in the Jalapeno JVM. OOPSLA. ACM (2000).

Chambers et al., "An efficient implementation of SELF, a dynamically-typed object-oriented language based on prototypes." LISP & Symbolic Computation, pp. 243-281 (1991).

Chambers et al., "Making pure object-oriented languages practical." OOPSLA Conf. Proc. (Oct. 1991).

Fink et al., "Design, implementation and evaluation f adaptive recompilation with on-stack replacement." Proc. Int'l Symposium on Code Generation and Optimization: feedback-directed and runtime optimization, pp. 241-252 (2003).

Holzle, et al., "Debugging optimized code with dynamic deoptimization." ACM SIGPLAN Conf. on Programming Langauge Design & Implementation (Jun. 1992).

Soman et al., "Efficient and general on-stack replacement for aggressive program specialization." Int'l Conf. on Programming Languages & Compilers (Jun. 2006).

USENIX ASSN., "Proc. JAVA virtual machine research and technology symposium." (JVM) (Apr. 2001).

Deconinick, G. et al., (1993), "Survey of Backward Error Recovery Techniques for Multicomputers Based on Checkpointing and Rollback", Proc. of IASTED Int. Conf. on Modelling and Simulation, Pittsburgh, PA, May 10-12, 1993, pp. 262-265.

Gschwind, M., et al. (2001 ), "Optimization and Precise Exceptions in Dynamic Compilation", ACM SIGARCH Computer Architecture News Homepage archive, vol. 29 Issue 1, Mar. 2001, pp. 66-74.

Riley, N. (2009), "Explicit Software Speculation for Dynamic Language Runtimes", Ph.D. Dissertation University of Illinois at Urbana-Champaign Champaign, IL, May 2009 (84 pages).

Su, L. et al., (2007), "Speculative Optimization Using Hardware-Monitored Guarded Regions for Java Virtual Machines" VEE'07 Jun. 13-15, 2007, San Diego, California, USA, pp. 22-32.

Thomson, J. et al., (2009), "Transactional Upgrade Rollback: the DSL Approach", accessed at: http://www.mancoosi.org/reports/tr4.pdf (43 pages).

* cited by examiner

OBSERVATION AND ANALYSIS BASED CODE OPTIMIZATION

BACKGROUND OF THE INVENTION

Co-pending U.S. patent application Ser. No. 12/847,925 entitled "ASSUMPTION-BASED OPTIMIZATION," filed Jul. 30, 2010, the entire contents of which are hereby incorporated by reference for all purposes, discloses optimizing a compiled code based an assumption, for example, and testing at runtime to ensure, prior to executing the optimized code, whether the assumption is true. Such a technique may be used, for example, to create a more efficient compiled version of software code written in a dynamic and flexible scripting and/or other programming language, such as JavaScript®.

A characteristic of dynamic languages, such as JavaScript®, is that certain attributes cannot be determined conclusively in advance to have a particular value. For example, the variable type of a variable typically cannot be guaranteed to be of a predetermined type. Similarly, at runtime a target (e.g., location of code corresponding to) a called function may have changed. As another example, the code comprising an operation may change. As such, typically at least certain techniques commonly used to generate optimized compiled versions of less dynamic code, such as statically typed code, have not been available to be used to optimize compiled versions of code written in a dynamic language such as JavaScript®.

BRIEF DESCRIPTION OF THE DRAWINGS

Various embodiments of the invention are disclosed in the following detailed description and the accompanying drawings.

DETAILED DESCRIPTION

Figure 1:
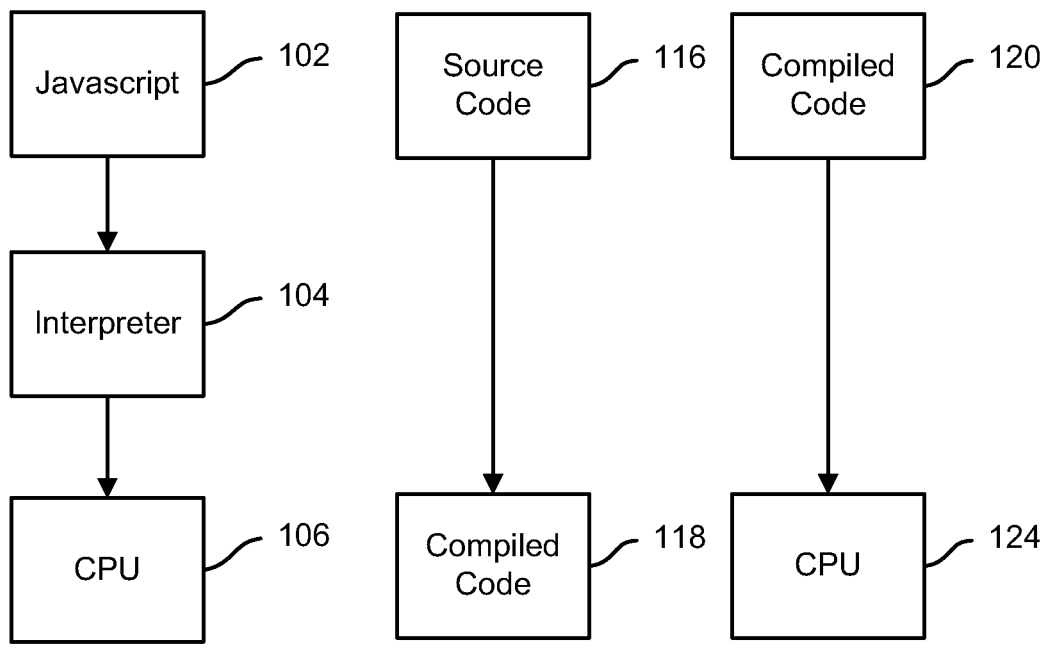
FIG. 1 illustrates an example in which JavaScript® is executed at runtime by an interpreter, an example of source code being compiled into compiled machine code prior to runtime, an example of compiled machine code being provided to a CPU for execution at runtime, and an example of pre-compiled JavaScript® being provided to a CPU for execution at runtime.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Assumption based optimization of software code is disclosed. In various embodiments, static and/or dynamic analyses are performed to formulate a hypothesis that a dynamic attribute likely will have at runtime a particular determined value. As used herein, a dynamic attribute is one the value of which cannot be determined, prior to runtime, to be guaranteed to have that value at runtime. Examples include the variable type of variables in code written in a dynamically typed language, such as JavaScript®, the target of a function called in code written in a dynamic language such as JavaScript®, and the code corresponding to an operation defined in such a dynamic language. Code is optimized based on an assumption that the dynamic attribute will have the determined value. In various embodiments, the code includes code to check at runtime to determine whether the assumption based on which the code has been optimized is valid (for example, to check if the variable is in fact of the type it was assumed it would be) and/or code to roll over to a backup code that is not based on the assumption in the event the assumption is determined at runtime not to be valid in a particular instance. Examples of techniques disclosed herein to determine the assumed value include, without limitation, an extended static analysis of the code, such as static type analysis, and dynamic analysis such as monitoring the execution of code at runtime. For example, in some embodiments code is monitored to determine, for example, whether a dynamically typed variable in practice always has been of a particular observed type, or whether the target of a function has remained the same, etc.

In some embodiments, after a roll over to backup code, execution may later use the code based on the assumption. For example if in a prescribed number of instances the dynamic attribute has been observed subsequent to roll over to have had the previously-assumed value, then in some embodiments execution may use the code that was optimized based on the assumption.

The following portion of the present disclosure begins with a discussion of assumption-based optimization of software code (part I) and continues with a further discussion of optimizing based on observations and/or assumptions made with respect to the expected value of a dynamic attribute (part II).

I. Assumption-Based Optimization

Traditionally, computer code written in an interpreted language such as JavaScript® is not executed directly by a computer processor, and instead must be interpreted at runtime by an interpreter, runtime environment, and/or other software entity. An example of such a typical configuration is shown in FIG. 1, specifically JavaScript® 102 is executed at runtime by an interpreter 104 which interprets the JavaScript® instructions and provides corresponding machine code instructions to central processing unit (CPU) 106 for execution. An interpreted language such as JavaScript® has the advantage of being intuitive, flexible, and easy to program, but such languages may be slow to execute since the code needs to be interpreted line by line at runtime before it can be executed.

By contrast, in traditional compiled programming languages, source code typically is compiled into machine code prior to runtime, e.g., source code 116 shown being compiled into compiled code 118 at a time earlier or separate from runtime in FIG. 1. Machine code comprises very low level instructions, which are typically stored in data storage and subsequently executed directly by a processor, e.g., compiled code 120 shown being provided directly to CPU 124 in FIG. 1, with the result that source code that has been compiled to machine code typically executes on a processor more quickly or efficiently than equivalent interpreted code (e.g., JavaScript®), which requires an interpreter at runtime to execute the equivalent machine code on the processor.

More recently, scripts and other code written in interpreted languages such as JavaScript® have been precompiled to machine code executable directly by a processor, e.g., precompiled JavaScript® (i.e., machine code generated prior to runtime based on JavaScript®) 140 shown in FIG. 1 as being provided to CPU 144 for execution at runtime. However, the gains achieved by compiling code written in an interpreted dynamic language such as JavaScript® prior to runtime in the past have been limited by the highly flexible, dynamic, and sometimes unpredictable nature and behavior of code written in such languages. For example, in JavaScript® the variable type of a variable may be dynamically assigned or changed at runtime and, as a result, certain optimizations that could otherwise be performed on a pre-compiled version of such code, for example type-specific optimizations, cannot be performed, resulting in less optimized compiled code.

Figure 2:
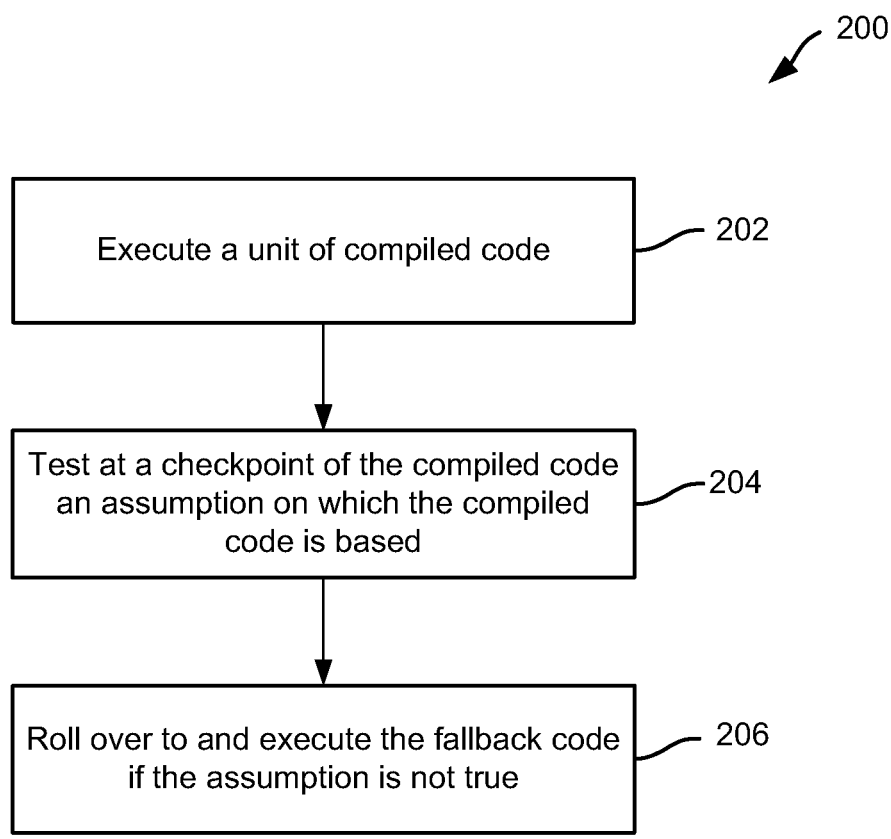
FIG. 2 is a flow diagram illustrating an embodiment of a process for processing source code written in a traditionally interpreted language.

FIG. 2 is a flow diagram illustrating an embodiment of a process 200 for executing software code. In the example shown, a unit of assumption-based compiled code associated with a unit of source code is executed 202. An assumption on which a specific aspect of the assumption-based compiled code is based (e.g., an optimization) is tested at a checkpoint of the compiled code 204. A roll over or transition to fallback code is performed and the fallback code is executed if the test indicates the assumption is not true 206.

In some embodiments, the assumption-based compiled code is low level machine readable code compiled from the source code and is specific to the platform that it is compiled for. The assumption-based compiled code is optimized in some embodiments based on an assumption while the fallback code is not optimized based on this assumption. In some embodiments, the assumption is one of a plurality of assumptions based on which the assumption-based compiled code is optimized. In some embodiments, the assumption is an assumption regarding a variable of the source code. In some embodiments, the assumption is an optimistic assumption of a likely form of the input variable, such as a likely value, type, and/or range of the variable.

In some embodiments, the assumption-based compiled code includes instructions for testing the assumption at the checkpoint, for invoking the fallback code when the assumption is tested not true, and/or for rolling over to the fallback code (e.g., updating the runtime state of the fallback code so that the fallback code can continue correctly from the point where the assumption-based compiled code is rolled over to the fallback code). In some embodiments, the checkpoint is one of a plurality of checkpoints throughout the assumption-based compiled code for testing the assumption and the fallback code is executed when the assumption is tested not true at any one of the checkpoints. In some embodiments, each of the plurality of checkpoints corresponds to a separate unit of fallback code customized to that particular checkpoint. Code execution can continue correctly in the fallback code (from a point corresponding to the particular checkpoint's place in the source code without re-starting the routine) when the assumption is tested to be not true at the particular checkpoint.

In one example, a variable in a unit of source code can be dynamically assigned or changed at runtime to be an integer, float, or string, however based on analysis (e.g., based on dynamic analysis of past runs and/or static analysis of the code), it is determined that the variable may likely be an integer. Consequently, the assumption-based compiled code is optimized by assuming that the variable will be an integer so that the compiled code is simplified and made more efficient in situations where the assumption holds true. However, since the assumption-based compiled code is based on the assumption that the variable is an integer, it may not run correctly and/or efficiently in situations where this assumption does not hold true. In contrast, the fallback code is not based on the assumption and will run correctly when the variable is not an integer, although the fallback code may be less efficient than the assumption-based compiled code when the variable is an integer. The fallback code can be used as a backup for the optimized assumption-based compiled code when the assumption does not hold true.

Figure 3:
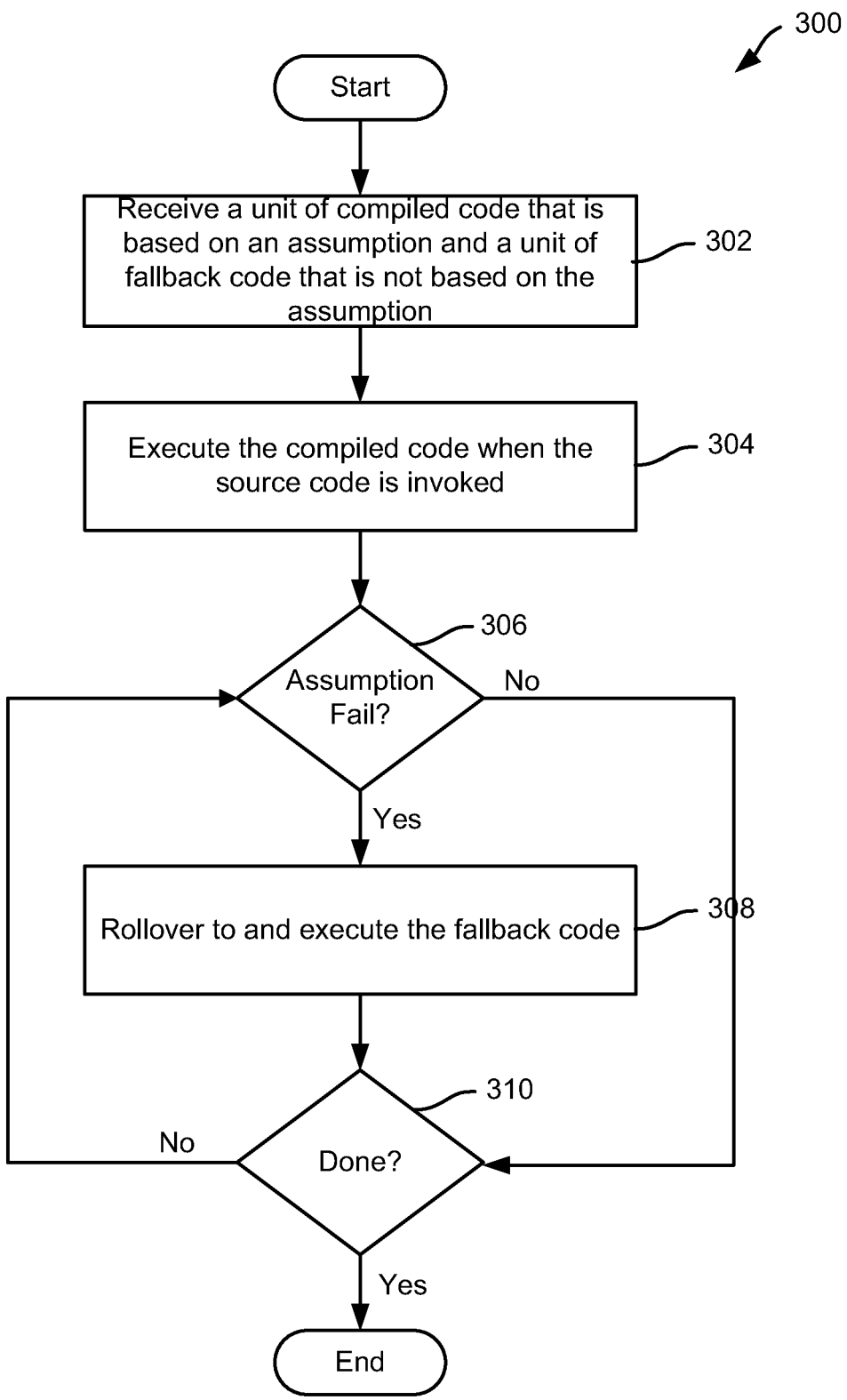
FIG. 3 is a flow diagram illustrating an embodiment of a process for processing source code written in a traditionally interpreted language such as JayaScript®.

FIG. 3 is a flow diagram illustrating an embodiment of a process 300 for executing software code. In the example shown, a unit of assumption-based compiled code associated with a unit of source code and fallback code associated with the source code are received and/or generated locally on a local computing environment 302. The assumption-based compiled code in some embodiments comprises low level machine readable code that is optimized based on an assumption, compiled based on the source code, and is specific to the platform that it is compiled for. In contrast, the fallback code is not optimized based on the assumption. In some embodiments the fallback code is compiled machine code specific to the platform it is compiled for, but is not optimized or otherwise based on the assumption. In some embodiments the fallback code is the original source code which is then interpreted.

The assumption-based compiled form of the source code is executed when the source code is invoked 304. For example when a user browses a webpage and invokes the JavaScript® behind the webpage, a compiled version of the JavaScript® that is optimized based on an assumption is executed. As the assumption-based compiled code is executed, a checkpoint for testing the assumption is encountered and the assumption is tested at the checkpoint 306. For example, the assumption-based compiled code in some embodiments includes checkpoint code configured to test the validity of the assumption, for example at a point in the execution of the assumption-based code that occurs prior to a portion of the code that has been optimized or otherwise based on the assumption. If the assumption is tested to be true at the checkpoint 306, the assumption-based compiled code continues to be executed unless/until the above or in some embodiments another assumption proves false 306 or until execution is done 310. If the assumption is tested to be not true 306, the execution of the assumption-based compiled code is rolled over to the fallback code and the fallback code is executed instead 308. In some embodiments, rollover involves updating the runtime environment of the fallback code so that the fallback code can continue execution correctly from where the assumption-based compiled code stopped, and the system state is as if it has always been executing the fallback code alone, and the assumption-based compiled code had never been executed. In some embodiments, rollover involves rolling back the runtime environment to a saved state of the assumption-based compiled code and then updating the runtime environment of the fallback code with the saved state. In some embodiments, updating the runtime environment of the fallback code involves restoring the local variables and other relevant machine state, which can include but is not limited to register contents, stack state, and memory contents, while leaving the global variables alone. The checkpoint can be located at any appropriate point in the assumption-based compiled code. For example, if a section of the assumption-based compiled code is optimized based on an assumption, checkpoint(s) for the assumption can be placed before or within the section of code, so that the assumption can be tested before the execution of this section of code and/or during the execution of this section of code. Detection and collapsing of redundant checkpoints can be used to further optimize the assumption-based compiled code.

Figure 4:
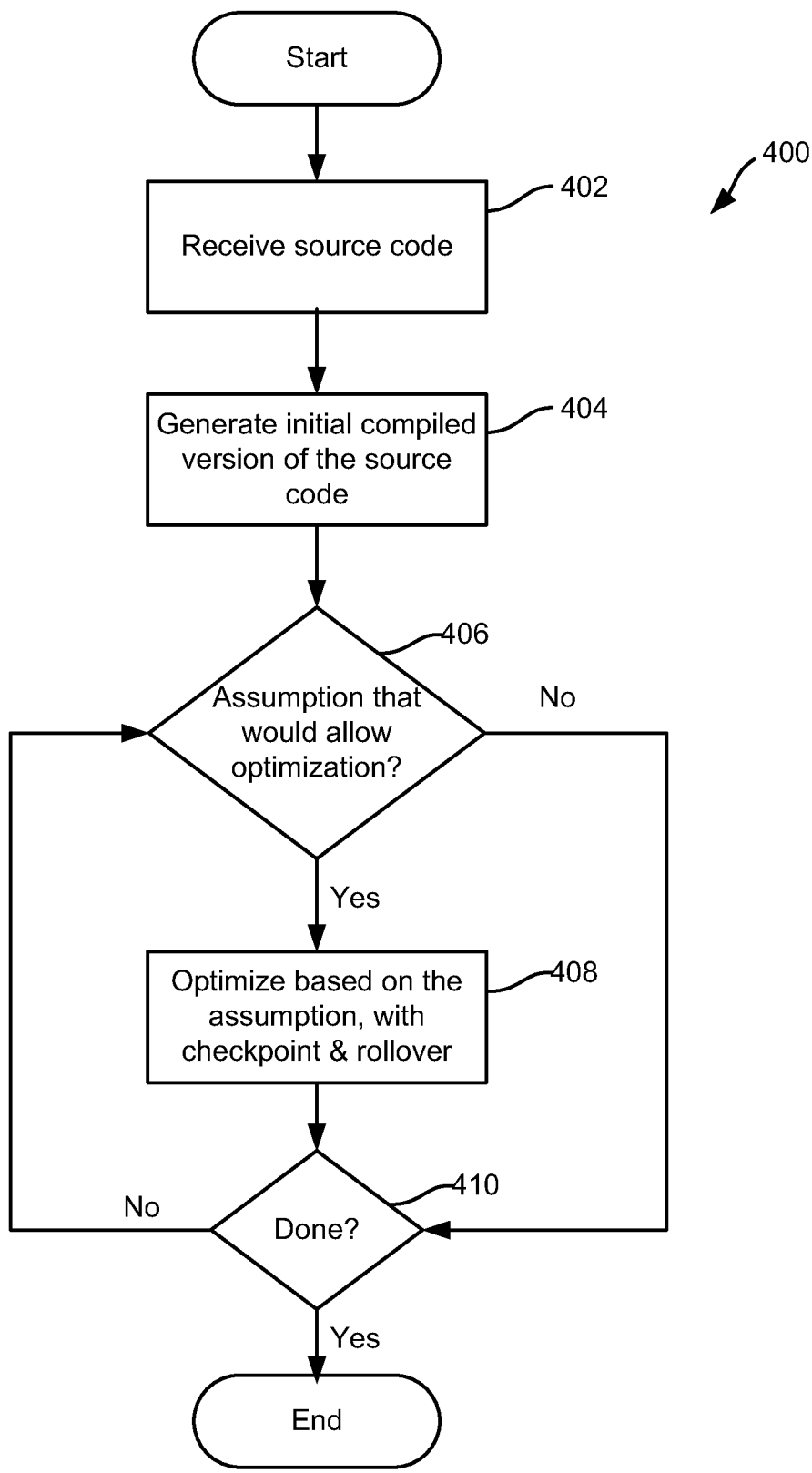
FIG. 4 is a flow diagram of an embodiment of a process for generating compiled code and fallback code, where the compiled code is based on an assumption and the fallback code is not.

FIG. 4 is a flow diagram of an embodiment of a process 400 for generating assumption-based compiled code and fallback code associated with a unit of source code, such as source code written in a traditionally interpreted language such as JavaScript®. In the example shown, source code is received (e.g., downloaded from or uploaded by another device) 402. An initial compiled version of the source code (e.g., compiled machine code specific to a platform and can be directly read by a processor) is generated 404. Analysis, such as static analysis of the source code and/or initial compiled code, and/or dynamic runtime analysis of the source code and/or initial compiled code, is performed to determine whether an assumption can be made that would allow an optimization of the initial compiled version of the source code (e.g., a section of the initial compiled version of the source code) 406. If an assumption based on which the initial compiled version of the source code can be optimized is found, the initial (or other current) compiled version of the source code is optimized based on the assumption to generate an optimized (or further optimized) compiled version of the source code 408. The optimized (or further optimized) compiled version of the source code includes in some embodiments one or more checkpoints for testing the validity of the assumption and for rolling over to fallback code if the assumption is tested not true. The process determines whether further optimization of the compiled version of the source code based on additional assumptions will be performed 406, 410. If yes, the steps 406, 408, and 410 are repeated to perform such further optimization. Analysis of the source and/or initially generated compiled code continues, and opportunities to optimize based on a potentially valid assumption (if any) are taken advantage of, until the entire code has been analyzed and no further opportunities for optimization based on an assumption are found 406, 410, at which time the process of FIG. 4 ends.

Figure 5:
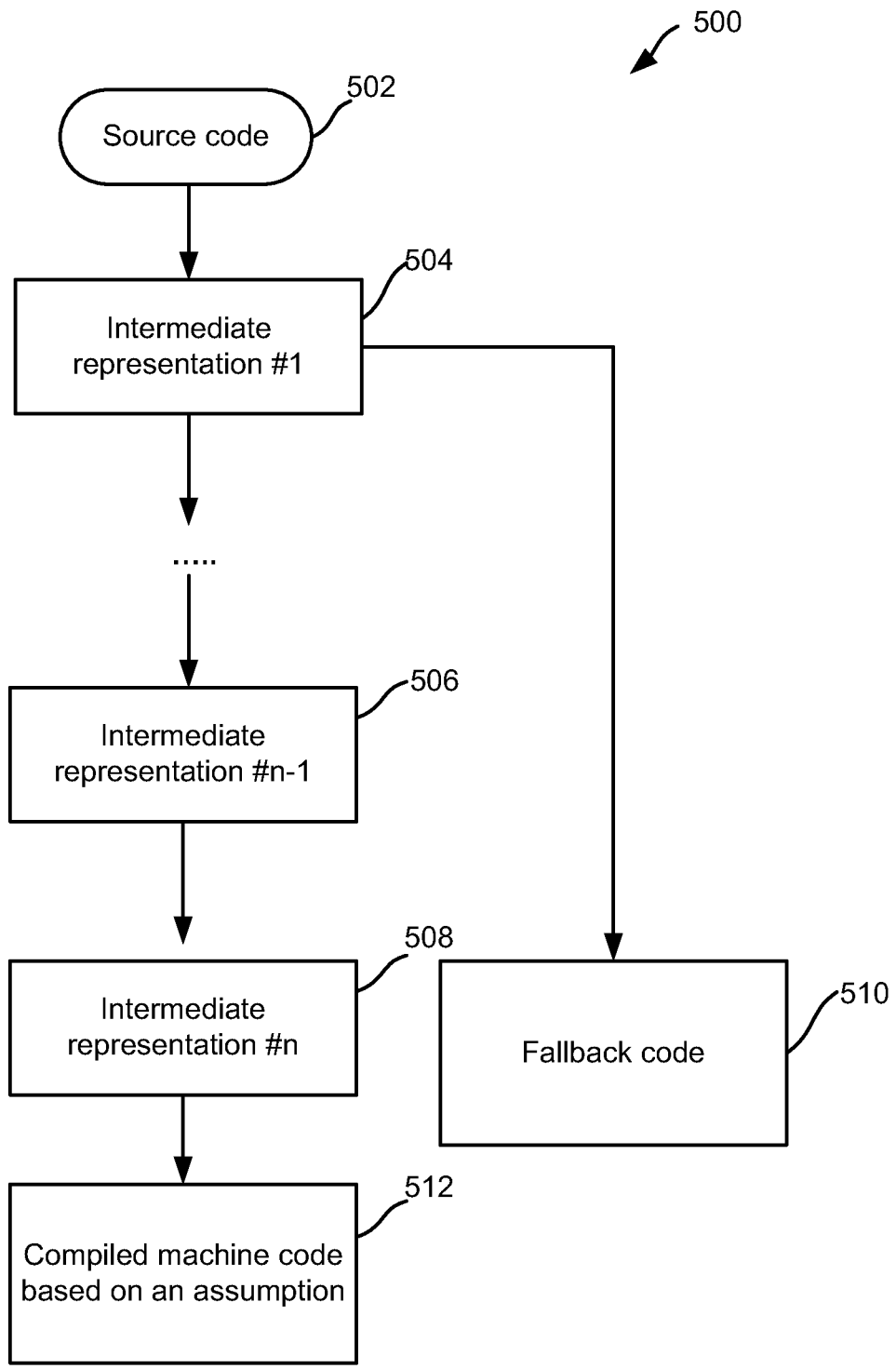
FIG. 5 is a flow diagram of an embodiment of a process for generating compiled code and fallback code, where the compiled code is based on an assumption and the fallback code is not.

FIG. 5 is a flow diagram for an embodiment of a process 500 for generating assumption-based compiled code and fallback code associated with a unit of source code. In the example shown, source code 502 is used to generate an initial intermediate representation 504 of the source code that is not optimized based on an assumption. The intermediate representation 504 in the example shown goes through successive rounds of optimization to generate subsequent intermediate representations represented in FIG. 5 by intermediate representations 506 and 508, the latter of which in this example is used ultimately to generate final assumption-based compiled code 512 that is optimized based on one or more assumptions. In some embodiments, the source code comprises JavaScript® and at least a subset of the intermediate representations shown in FIG. 5 comprise LLVM or other byte code, or another compiled or otherwise derived representation of the original source code. In the example shown, the final intermediate representation is used to generate assumption-based compiled code 512 that is optimized based on one or more assumptions. The initial intermediate representation 504 is used in this example to generate a compiled code that used as fallback code 510 that is not based on an assumption, e.g., one based on which an optimization of the initial intermediate representation 504 is performed to generate a subsequent, optimized intermediate representation. In some embodiments, for each intermediate representation that is optimized based on an assumption, corresponding fallback code is generated based on an intermediate version (e.g., 1 through n in this example) that is not based on that assumption, e.g., an intermediate version as it existed immediately prior to an optimization based on that assumption being performed. In some cases further or subsequent iterations of optimization may be facilitated by an assumption but may not themselves be based on any new assumption, so that not every intermediate representation would have or would require corresponding fallback code. In some embodiments, one or more assumptions may be made without new compiled fallback code being generated, and instead for example the original source code may be used as a fallback code if that particular assumption is found not to be true at runtime. While in the example shown in FIG. 5 multiple iterations of intermediate representation of the source code are generated, in other embodiments compilation may involve more or fewer stages than shown in FIG. 5.

Figure 6:
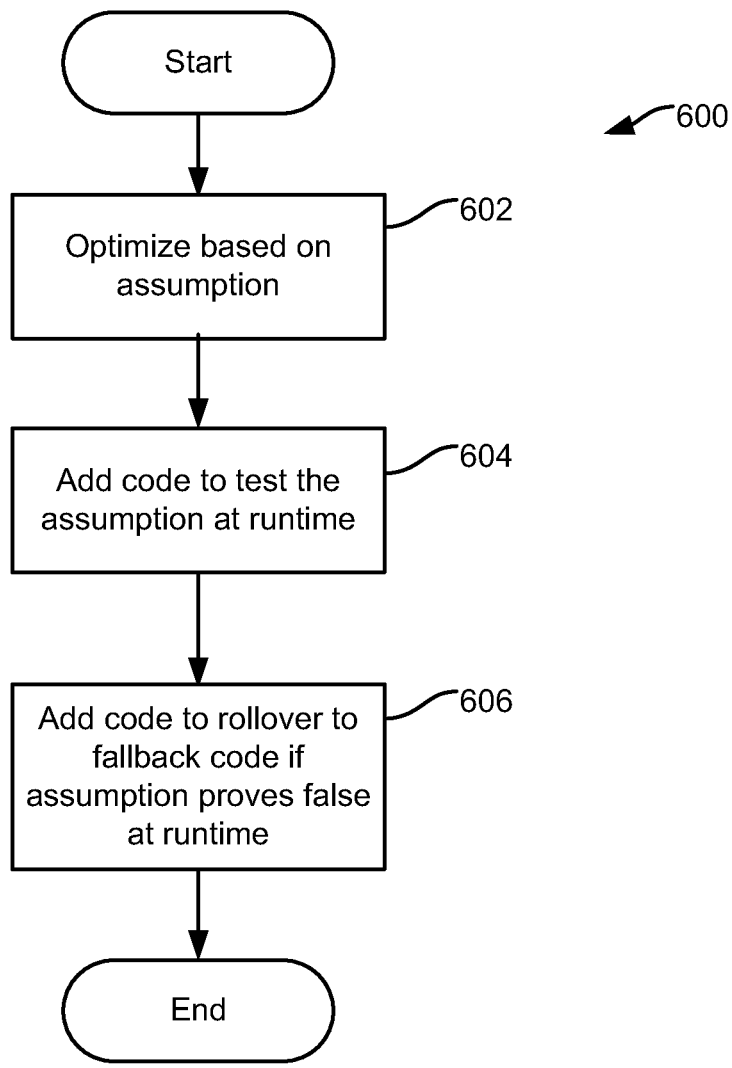
FIG. 6 is a flow diagram illustrating an embodiment of a process for optimizing compiled code based on an assumption.

FIG. 6 is a flow diagram illustrating an embodiment of a process 600 for optimizing compiled code based on an assumption (e.g., the step 408 of FIG. 4). In the example shown, the compiled code associated with the source code is optimized based on an assumption 602. Code for testing the assumption is true is added to the compiled code 604. Code for rolling over to fallback code, if the assumption is found at runtime not to be true, is added to the compiled code 606. In various embodiments, the process 600 is repeated for each assumption that is made.

Figure 7:
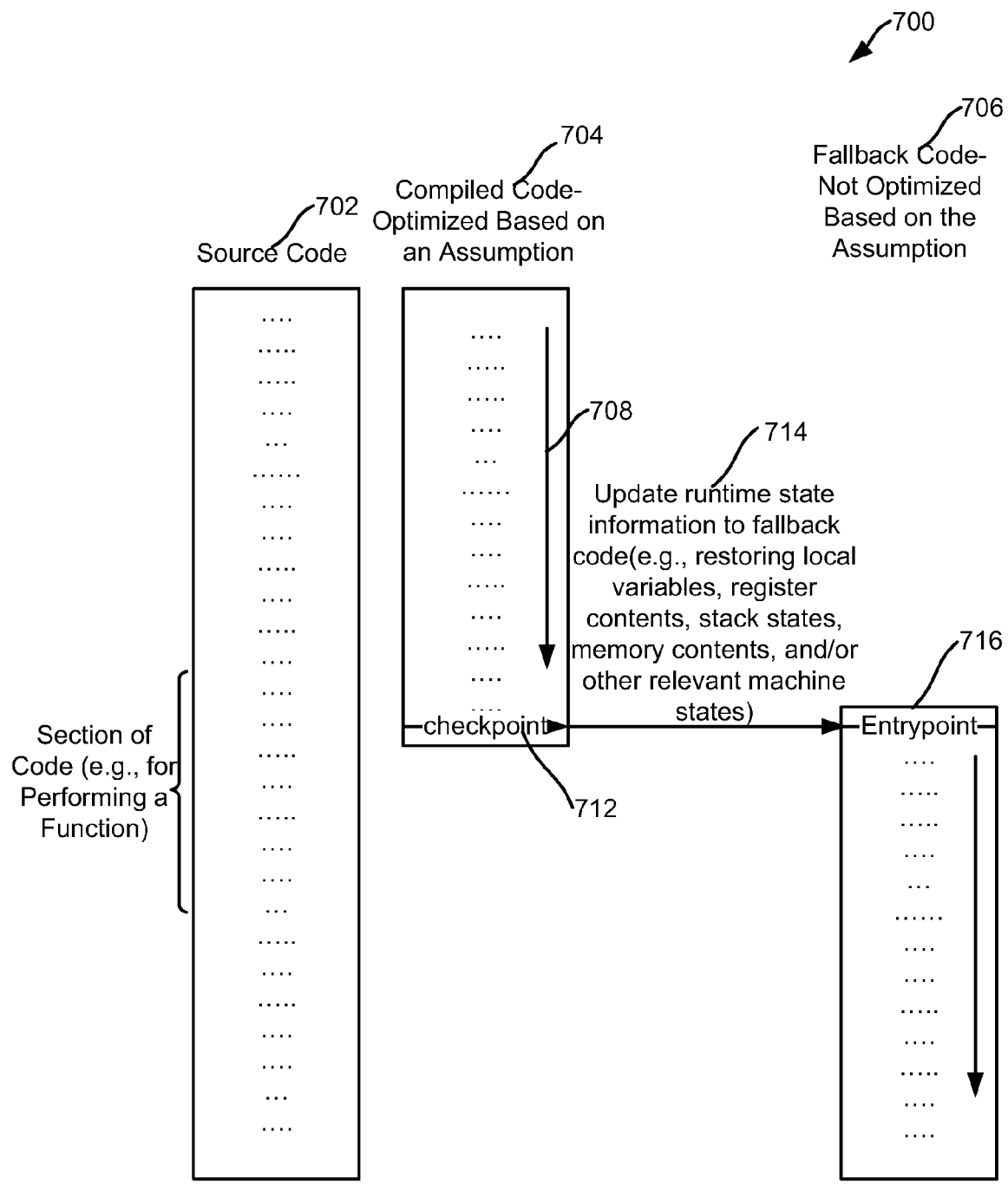
FIG. 7 is flow diagram illustrating an embodiment of a process for rolling over from compiled code that is optimized based on an assumption to fallback code that is not optimized based on the assumption.

FIG. 7 is flow diagram illustrating an embodiment of a process 700 for rolling over from a unit of assumption-based compiled code to fallback code. In the example shown, assumption-based compiled code 704 associated with a unit of source code 702 is optimized based on an assumption. The compiled code 704 includes code configured to execute a roll over to fallback code 706 that is not optimized based on the assumption, beginning at an associated entry point 716. In the example shown, the fallback code 706 is compiled code of the source code 702 and is not optimized based on the assumption. In the example shown, when the source code 702 is invoked (e.g., when a user browses a webpage containing the source code), the assumption-based compiled code 704 is executed 708. At a checkpoint 712, the assumption is tested. If the assumption is tested true, execution of the assumption-based compiled code 704 continues (not shown in FIG. 7). If the assumption is tested false, rollover code included in the assumption-based compiled code 704 executes a rollover to fallback code 706, which may involve updating a runtime environment associated with the fallback code 706 to a state in which it would have been had the fallback code 706 been executing all along 714. Updating the runtime state may involve restoring local variables, register contents, stack states, memory contents, and/or other relevant machine states, which may be specific to the particular architectures/ABI involved. Execution of the fallback code 706 begins and continues from entry point 716 in the fallback code 706.

Figure 8:
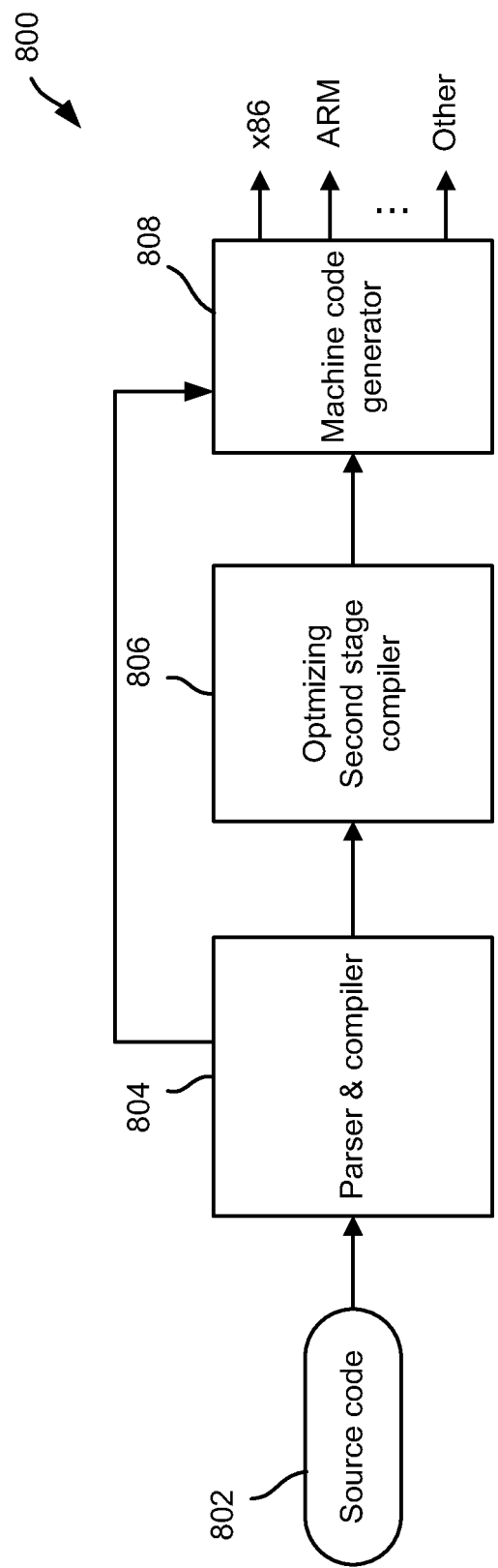
FIG. 8 is a block diagram illustrating an embodiment of a system for processing source code written in a traditionally interpreted language such as JavaScript®.

FIG. 8 is a block diagram illustrating an embodiment of a system 800 for generating compiled code that is based on (e.g., optimized based on) an assumption and fallback code that is not based on the assumption. In the example shown, source code 802 is provided to a parser and initial compiler 804, which parses the source code and generates an initial intermediate representation. In various embodiments, the initial intermediate representation may be bytecode or another derived representation of the original source code. The initial intermediate representation is provided to an optimizing second stage compiler 806, which performs one or more rounds of optimization on the initially generated intermediate representation and provides as output a second intermediate representation of the source code 802, e.g., low level virtual machine (LLVM) or another low level intermediate representation. The optimization may be based on one or more assumptions, for example as discussed above in connection with FIGS. 2 & 3. The system also includes a machine code generator 808 that is configured to use the initial and/or the second (and/or other subsequent) intermediate representations to generate device-specific or computing-platform-specific machine code, e.g., machine code appropriate to processors of the x86, ARM, or other architectures. The generated machine code may be cached in the data storage and made available to each of one or more devices or systems, for example at a subsequent device synchronization time with the one or more devices or systems, machine code appropriate for that device or system. In some embodiments, the machine code generated based on the second intermediate representation and the machine code generated based on the initial intermediate representation are used as the compiled code optimized based on an assumption and the fallback code, respectively, for the processes discussed in reference to FIGS. 2 & 3.

Figure 9:
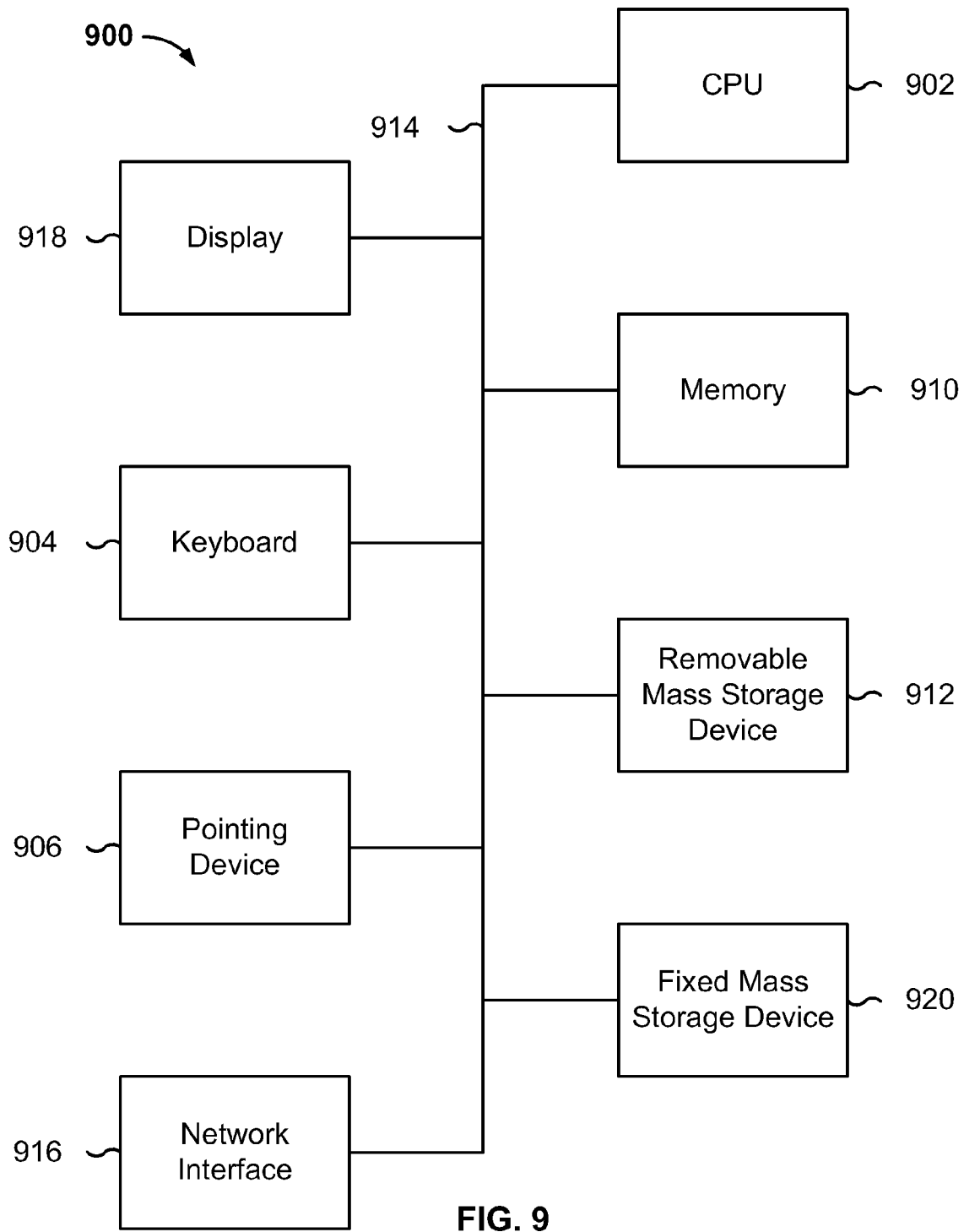
FIG. 9 is a block diagram showing an embodiment of a system for processing source code written in a traditionally interpreted language such as JayaScript®.

FIG. 9 is a block diagram of a computer system 900 used in some embodiments to process software code as described herein. FIG. 9 illustrates one embodiment of a general purpose computer system. Other computer system architectures and configurations can be used for carrying out the processing described herein. Computer system 900, made up of various subsystems described below, includes at least one microprocessor subsystem (also referred to as a central processing unit, or CPU) 902. That is, CPU 902 can be implemented by a single-chip processor or by multiple processors. In some embodiments CPU 902 is a general purpose digital processor which controls the operation of the computer system 900. Using instructions retrieved from memory 910, the CPU 902 controls the reception and manipulation of input data, and the output and display of data on output devices.

CPU 902 is coupled bi-directionally with memory 910 which can include a first primary storage, typically a random access memory (RAM), and a second primary storage area, typically a read-only memory (ROM). A removable mass storage device 912 provides additional data storage capacity for the computer system 900. Storage 912 may also include computer-readable media such as magnetic tape, flash memory, signals embodied on a carrier wave, PC-CARDS, portable mass storage devices, holographic storage devices, and other storage devices. A fixed mass storage 920 can also provide additional data storage capacity. A common example of mass storage 920 is a hard disk drive.

In addition to providing CPU 902 access to storage subsystems, bus 914 can be used to provide access other subsystems and devices as well. In the described embodiment, these can include a display monitor 918, a network interface 916, a keyboard 904, and a pointing device 906, as well as an auxiliary input/output device interface, a sound card, speakers, and other subsystems as needed. The pointing device 906 may be a mouse, stylus, track ball, or tablet, and is useful for interacting with a graphical user interface. The network interface 916 allows CPU 902 to be coupled to another computer, computer network, or telecommunications network using a network connection as shown.

The computer system shown in FIG. 9 is but an example of a computer system suitable to implement techniques described herein. Other computer systems suitable for such use may include additional or fewer subsystems.

Figure 10:
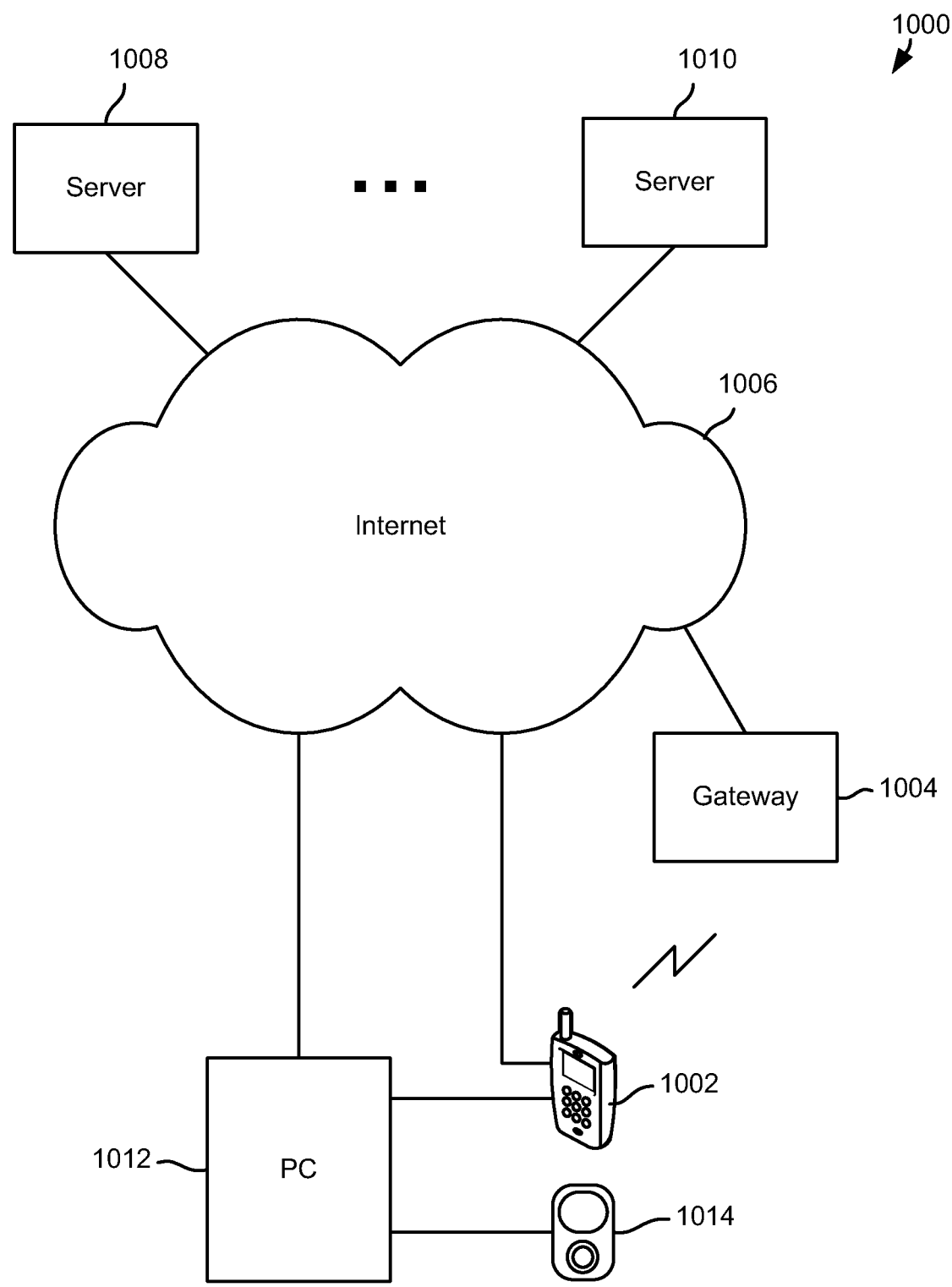
FIG. 10 is a block diagram illustrating an embodiment of a system for processing source code written in a traditionally interpreted language such as JayaScript®.

FIG. 10 is a block diagram illustrating an embodiment of a system 1000 for processing a source code written in a traditionally interpreted dynamic language such as JavaScript®. In the example shown, a device 1002 such as a phone, PDA, portable computer, or other device is directly connected up to a network via land wire and/or wirelessly through a gateway 1004 (in various embodiments through one or more other networks, nodes, and/or devices not shown in FIG. 10), and via the network with one or more web or other devices (e.g., server 1008, 1010). In various embodiments, the device 1002 is configured to access, via the internet 1006, web pages, web applications, applets, widgets, or other resources available for download from servers such as servers 1008 and 1010, all or some of which resources may include JavaScript® or other traditionally interpreted code. In various embodiments, the device 1002 is configured to execute various computer codes such as a source code (e.g., a source code written in traditionally interpreted dynamic language such as JavaScript® ), a compiled code of a source code (e.g., compiled code that is based on or not based on an assumption), and/or other derived code of the source code such as a device independent intermediate representation of the source code (e.g., intermediate representation). In various embodiments, the device 1002 is configured to in some instances download computer code from another device or system (e.g., server 1008, 1010). In various embodiments, the device 1002 is configured to, upon the initial download of the source code written in interpreted language such as JavaScript®, generate, optimize, and/or cache an intermediate and/or other compile representation of the downloaded source code. In various embodiments, the device is configured to generate, optimize, and/or cache (e.g., prior to runtime or dynamically at runtime) a compiled machine code of the source code that is specific to the computing platform it is generated for and/or which is based on an assumption, as described above. In some embodiments, the device 1002 implements one or more of the processes of FIGS. 2-6. In various embodiments, the device is configured to cache the downloaded or generated code in data storage. In various embodiments, the device 1002 is configured to make the cached computer codes available to other devices (e.g., server 1008, 1010, device 1014, and personal computer 1012) upon synchronization with the one or more devices.

II. Optimizing Based on Observed and/or Assumed Value of Dynamic Attribute

Figure 11:
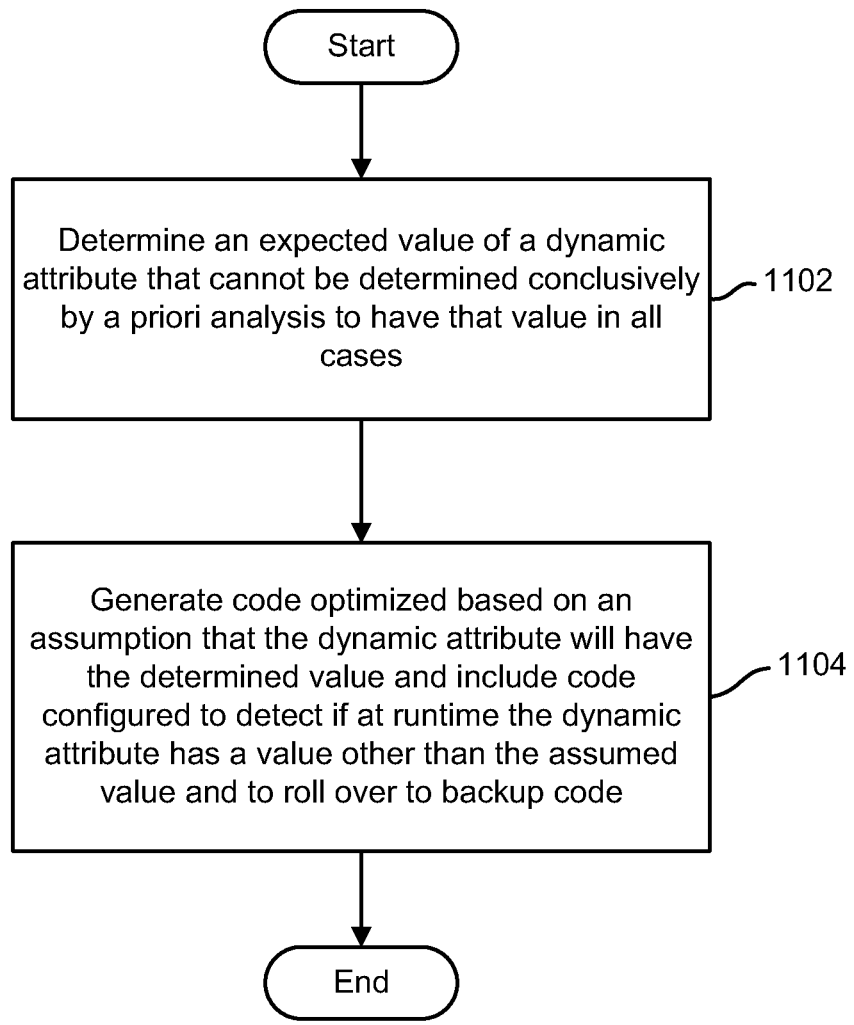
FIG. 11 is a flow diagram illustrating an embodiment of a process for optimizing software code.

FIG. 11 is a flow diagram illustrating an embodiment of a process for optimizing software code. In the example shown, at 1102 an expected value is determined for a dynamic attribute the value of which cannot be determined conclusively, prior to runtime, to have the expected value in all cases. In various embodiments, one or more techniques may be used to determine the expected value. For example, an expected value may be determined by static and/or dynamic analysis of a function or other code with which the dynamic attribute is associated. For example, an hypothesis may be formed based on static analysis of code that the dynamic attribute is related to directly and/or indirectly that the dynamic attribute will, and/or is likely to have at runtime, an expected value determined by the static analysis, even if the dynamic attribute cannot be guaranteed to have that value, as would be the case, for example, for a type attribute for a variable in software code written in a dynamically typed programming language. In various embodiments, one or more heuristics and/or algorithms may be used to determine the "expected" value. For example, in some cases an external variable associated with but not internal to a function may be assumed (at least initially) to have a same type as an internal variable that has been determined (conclusively or otherwise) to have (or be expected and/or assumed at least initially to have) a determined type. In some embodiments, the determination may be made based at least in part on dynamic observation of the code during execution. For example, if a dynamically typed variable is observed to have been of an observed type in at least a threshold number of instances, without any (or more than a second threshold number of) intervening instances having been observed as having been of a type other than the observed type, then in some embodiments the observed type would be determined to be the "expected" type for the dynamically typed variable.

At 1104, code that is optimized based on an assumption that the dynamic attribute (likely) will have at runtime the value determined in 1102 to be the "expected" value is generated. In various embodiments, the code generated at 1104 included code configured to check at runtime to verify that the dynamic attribute does in fact have the expected value, and if not to roll over to backup code that is not based on an assumption that the dynamic attribute has the expected value. For example, in some embodiments if an instance of a dynamically typed variable is determined at runtime to be of a type other than an expected type based on which the code has been optimized, a rollover to code not based on an assumption that the variable will be of the expected type is performed.

Figure 12:
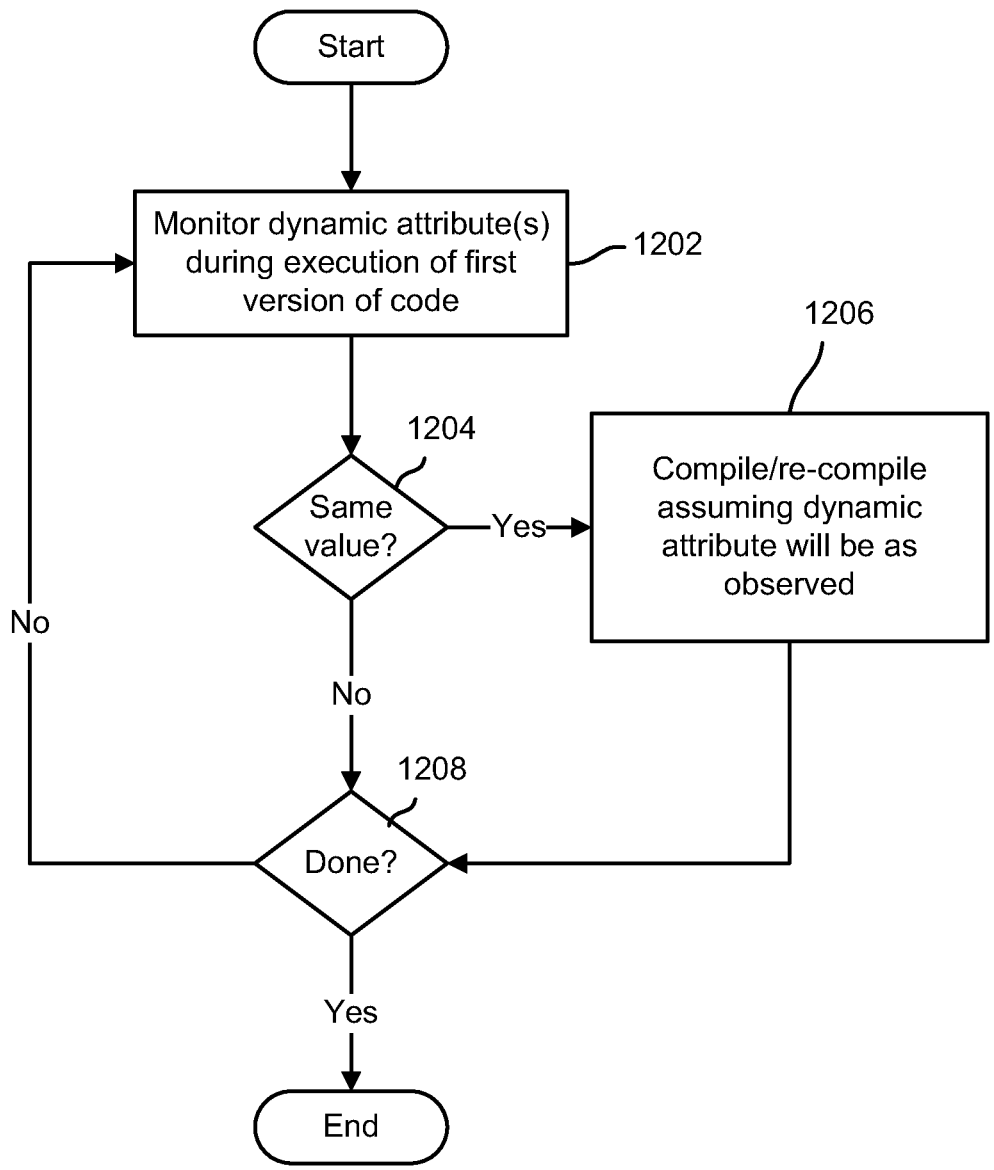
FIG. 12 is a flow diagram illustrating an embodiment of a process for optimizing code.

FIG. 12 is a flow diagram illustrating an embodiment of a process for optimizing code. In the example shown, at 1202 a value of a dynamic attribute is monitored during execution of a first version of a software code. If the dynamic attribute is determined to have had a same observed value sufficiently consistently, e.g., a prescribed number of occurrences and/or observations, and/or over a prescribed period of time (1204), then the code is compiled, re-compiled, and/or optimized based on an assumption that the dynamic attribute (likely) will have the observed value (1206). In the example shown, the process continues, potentially with other dynamic attributes being observed and on that basis determined to have an observed value (1202, 1204) and further optimizations being made based thereon (1206), until the process is done (1208), for example, a period of monitoring and/or observation in an effort to further optimize the code, comes to an end.

In some embodiments, the process of FIG. 12 is used to optimized code based on an assumption, determined based at least in part by dynamic analysis of un-optimized code while executing, that a dynamic attribute has been observed to remain unchanged during execution. For example, code written in a dynamic language such as JavaScript® may include numerous "puts" to and "gets" from global properties the location and/or value of which is not guaranteed to remain unchanged during the course of execution of the code and/or calls to methods of global objects and/or to global functions that are not guaranteed to remain unchanged during execution. Similarly, functions in JavaScript® runtime libraries are unlikely to change, but the nature of the language is such that there is no guarantee that they will not change. For example, the expression "Math.sin( )" invokes a method of a global object that returns the sine of the argument to a prescribed number of decimal places. Some developers may not realize that the expression "Math.sin(a) +Math.sin(b)" results in two calls to the "Math.sin" method of the Math global object, each requiring a corresponding look up of the object location. However, optimizations based on the assumption that the location of the object will not change and/or the underlying method will not change cannot simply be made, without doing more analysis as well as runtime checking, because other code may result in the location and/or method being changed at runtime between the first and second call to the method.

Similarly, the expression "x=Math.pi*Math.pi requires two "gets" of the constant value of pi, stored in JavaScript® as the property Math.pi of the global object Math. An optimization requiring only one get, such as a=Math.pi, x=a*a, cannot simply be made, without doing more analysis as well as runtime checking, because the location of the Math object and/or the value of the constant "pi" may be changed, intentionally or inadvertently, between the two gets.

Therefore, in some embodiments, un-optimized code is instrumented to facilitate observation of the code during execution. Where potential opportunities to optimize code (or optimize further) by collapsing implicit puts/gets and/or repeated look ups for successive global object method and/or function calls are identified, the code is instrumented to record the location and/or a hash or other representation of method/function code to determine whether it can (likely) be assumed that the location and/or method/function are always the same during execution. If so, then in some embodiments code optimized based on an assumption that the location and/or function will be and remain as observed is generated. In some embodiments, static analysis is performed to identify as large a section of code as possible within which it is reasonable to expect that the location of a global property or object and/or the content of a global function or method have not changed, for example as a side effect of other code and/or explicit or implicit "puts" to a global property or redefinition of a global function or a method of a global object. The optimized code includes code configured to test at runtime to verify that the assumption is valid. If the assumption is found not to be valid, execution reverts to code that has not been optimized based on the assumption.

Figure 13:
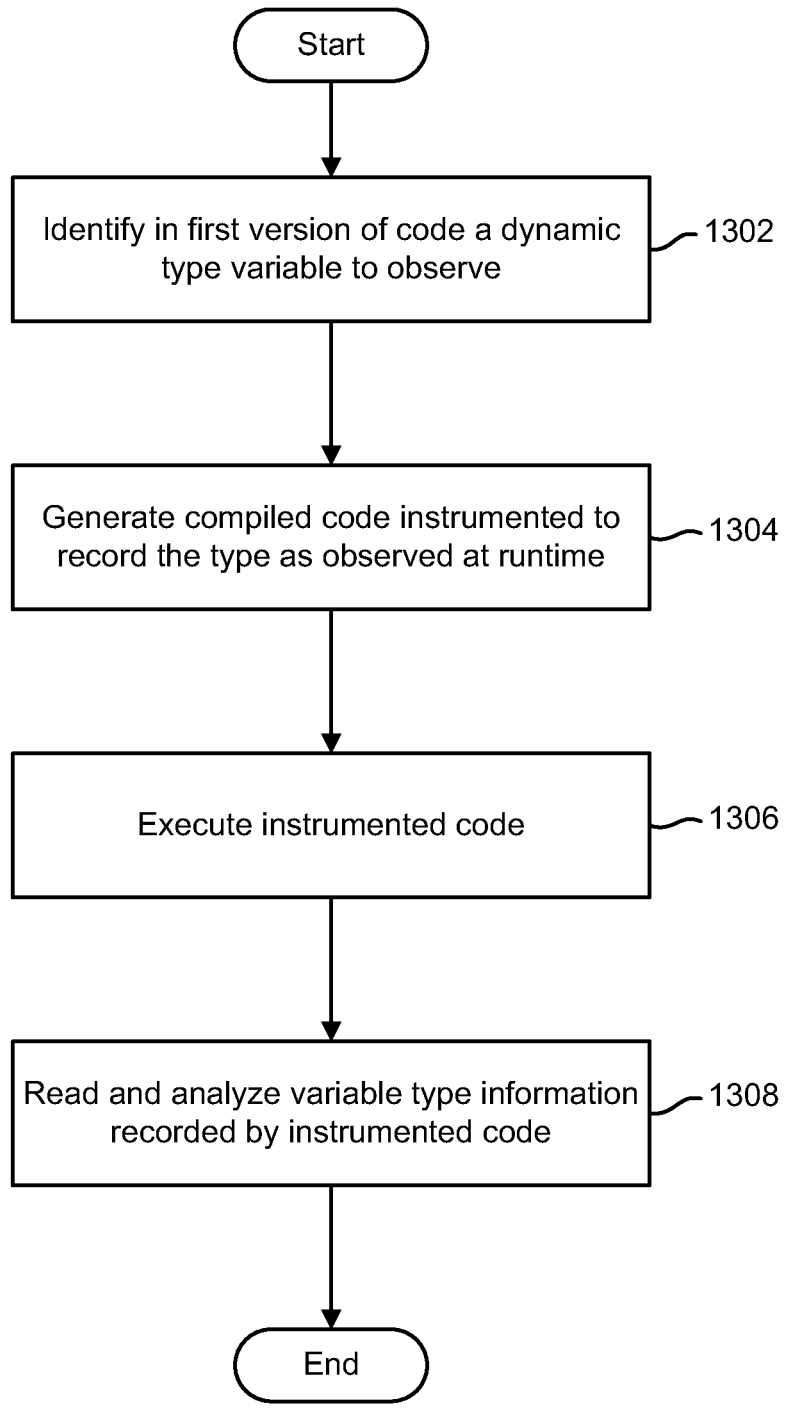
FIG. 13 is a flow diagram illustrating an embodiment of a process for monitoring execution of code.

FIG. 13 is a flow diagram illustrating an embodiment of a process for monitoring execution of code. In some embodiments, the process of FIG. 13 is used to perform, facilitate, and/or in connection with 1202 and/or 1204 of FIG. 12. In the example shown, a dynamically typed variable (or other entity with a dynamic attribute) in a first version of code is identified to be observed (1302). Compiled code instrumented to observe and/or record at runtime the variable type of observed instances of the variable is generated (1304). The instrumented code is executed (1306). In various embodiments, as instances of the monitored variable occur and/or are observed during execution, the variable type of each observed instance is recorded by the instrumented code. In some embodiments, only a prescribed number and/or frequency of observations are made. For example, the code may be instrumented to observe and record the variable type of the first n occurrences of the variable. The recorded variable type information is read (from the location in which the instrumented code stored it) and analyzed (1308). In some embodiments, the analysis includes determining whether the observed variable type has been (sufficiently) consistent during the observation period and/or a sufficient portion thereof. If so, then the code in some embodiments is (further) optimized based on an assumption that the variable will be of the observed type. In some embodiments, the number of observations made and/or the threshold (for example, number of observed occurrences) to conclude that code optimized based on an assumption that the dynamic attribute (likely) will have the observed value is or may be adjusted to reflect static analysis. For example, if by static analysis an hypothesis is formed that the dynamic attribute will have an hypothesized value, a fewer number of observed instances of the attribute having that value may be considered sufficient to confirm the hypothesis, whereas a greater number of observations may be required if static analysis was not performed and/or was not sufficiently conclusive to form an hypothesis.

Figure 14:
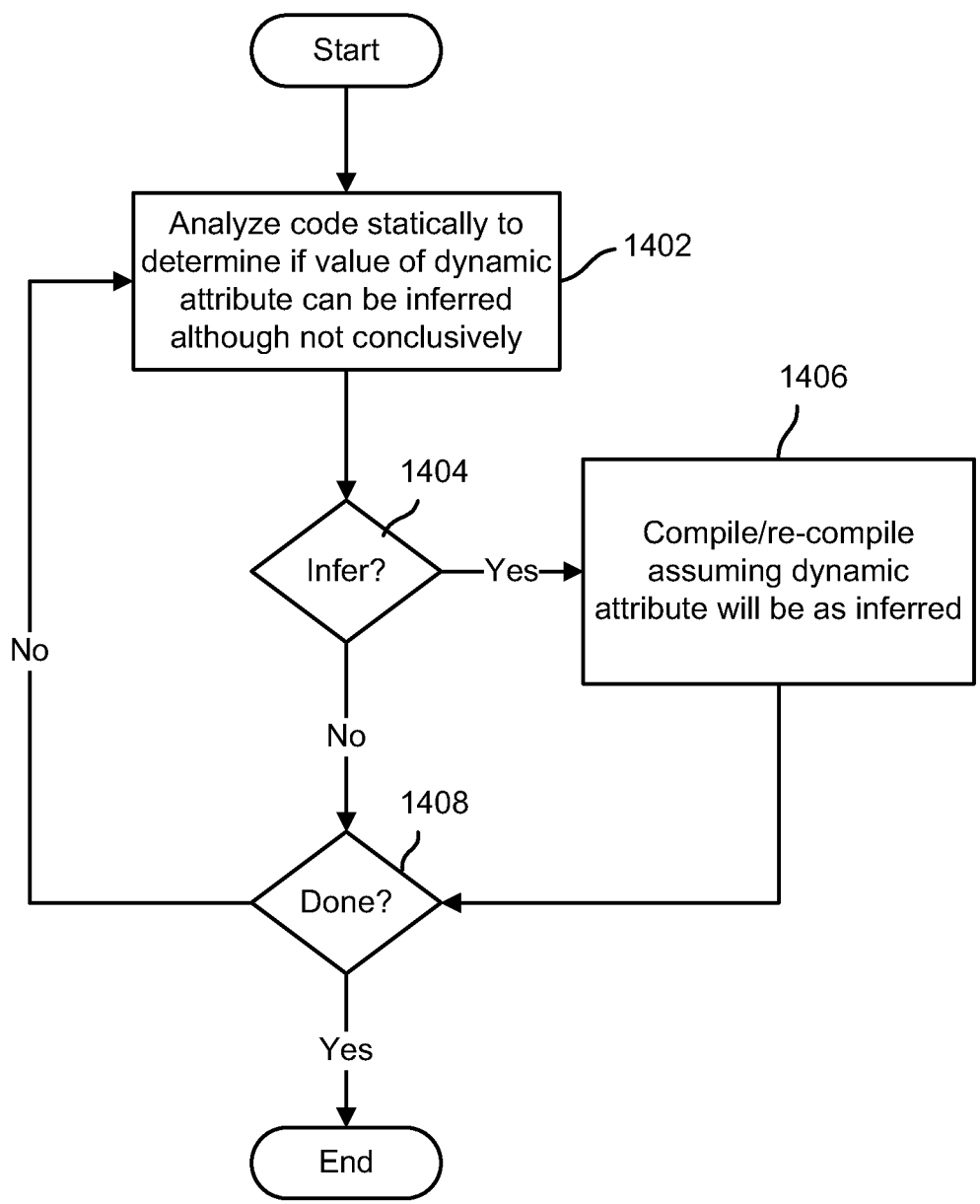
FIG. 14 is a flow diagram illustrating an embodiment of a process for optimizing code.

FIG. 14 is a flow diagram illustrating an embodiment of a process for optimizing code. In the example shown, the code is analyzed statically to determine if the value of a dynamic attribute can be inferred, even if not conclusively (1402). For example, in a statically typed language, a variable that is initialized and defined as an integer to which an operation that increments the variable by adding "1" to it in successive iterations (e.g., ++i in the C programming language), then the result can be determined conclusively through static analysis to remain an integer through each iteration. As a result, optimizations that depend on the variable i being an integer, such as replacing a general addition operation with integer +integer addition, which is a more efficient operation that the add operation that must be performed if the variables being added are not all integers, can be performed. However, in a dynamically typed language, such as JavaScript®, it cannot be guaranteed that a variable initialized as an integer and to which "1" is added is successive iterations will in every case remain an integer. In some embodiments, if it can be determined through static analysis of dynamically typed code, such as JavaScript®, that a variable is initially and is likely to remain of a particular type, such as integer, then at 1402 the type is inferred to be the likely type. If a value can be inferred, even if not conclusively (1402, 1404), then the code is compiled (or re-compiled and/or otherwise optimized) based on an assumption that the dynamic attribute will (likely) have the inferred value (1406). In various embodiments the code compiled, re-compiled, and/or otherwise optimized at 1406 includes code to test at runtime whether the dynamic attribute has the inferred value, and if not to roll over to backup code that is not based on the assumption that the dynamic attribute has the value inferred at 1402. If no (further) dynamic attribute value can be inferred and/or once code has been generated that is optimized based on one or more inferred values, analysis continues until ended, for example, no further candidates for inference are found (1408), at which time the process ends.

Figure 15:
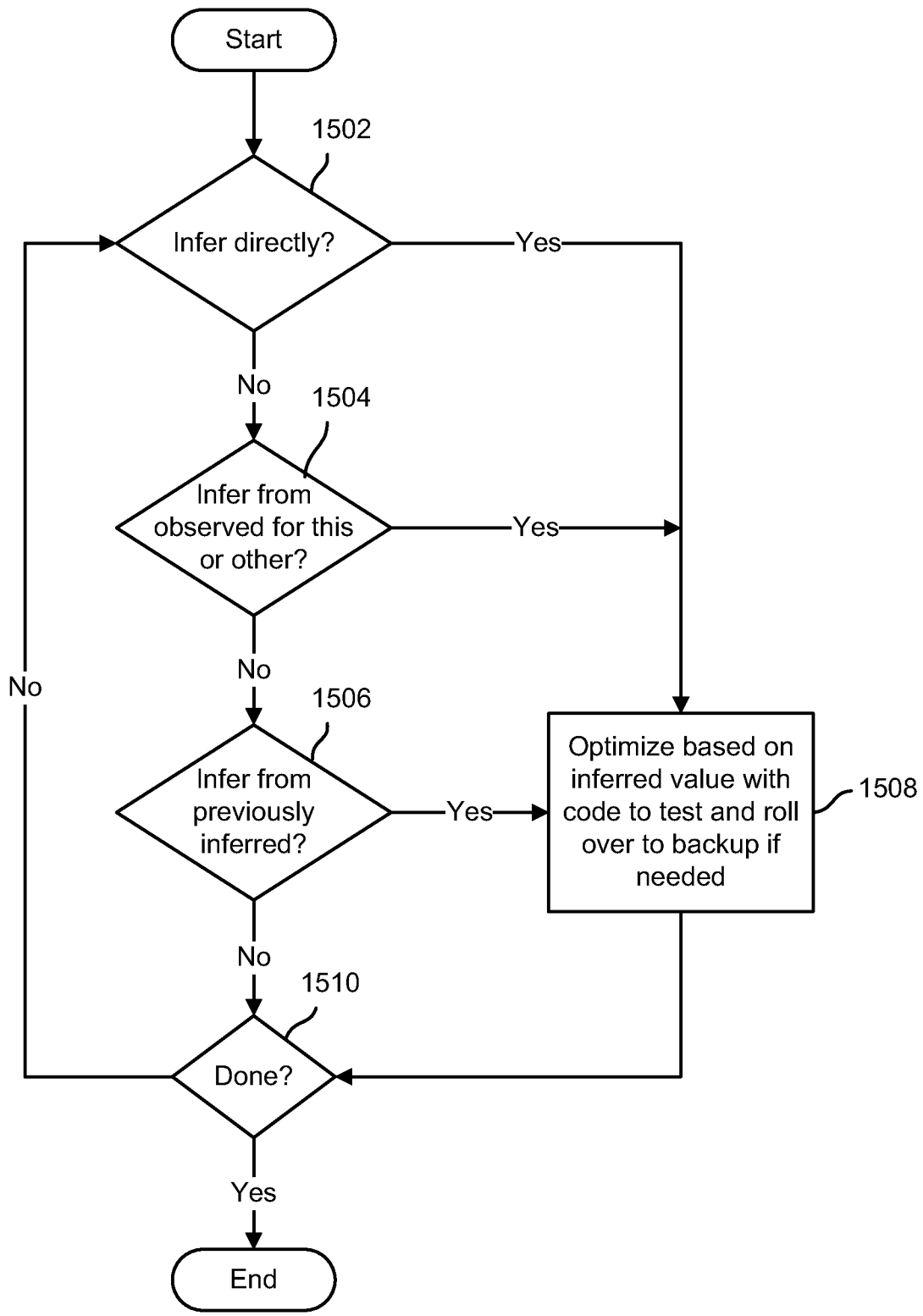
FIG. 15 is a flow diagram illustrating an embodiment of a process for inferring a dynamic value.

FIG. 15 is a flow diagram illustrating an embodiment of a process for inferring a dynamic value. In various embodiments, the process of FIG. 15 is used to implement 1402 of FIG. 14. In the example shown, it is determined whether the value can be inferred directly (1502), inferred by observing this or another value (1504), or inferred based on a previously inferred and/or otherwise determined value (1506). For example, a variable type may be inferred directly as in the example above, in which while dynamically typed a variable that is initialized to have a value that is an integer and to which only integer are added (e.g., var i =0, ++i, etc.), then at 1502 it is inferred that the variable will (likely) be an integer, even though it cannot be guaranteed to always be such. Similarly, if a value related to the dynamic attribute is determined, for example through observation of dynamic code during execution (e.g., JavaScript® while being executed by an interpreter) to consistently (or sufficiently consistent) have a particular observed value, then at 1504 it may be possible to infer a value for the dynamic attribute. For example, if the variable total is initialized to have an integer value and during observation it is determined that the value of array[i] has always been observed to be an integer, then in some embodiments the variable total in a function that adds to total the value of an array [i] and returns the result would be inferred at 1504 to be and (likely) remain an integer. In some embodiments, once one dynamic value has been inferred (albeit inconclusively) one or more further inferences may be made at 1506. For example, if the internal variables of a function are inferred to be of a particular type (e.g., integer), then in some embodiments one or more related external variables may also be inferred to be of the same type. If a value of the dynamic attribute can be inferred (1502, 1504, 1506), then the code is optimized based on an assumption that the dynamic attribute (likely) will have the inferred value, and code to test the assumption at runtime and roll over to backup code if the assumption is not found to be valid is included (1508). The process of FIG. 15 continues until done (1510), for example no further dynamic attributes that are candidates for inference are found.

Figure 16:
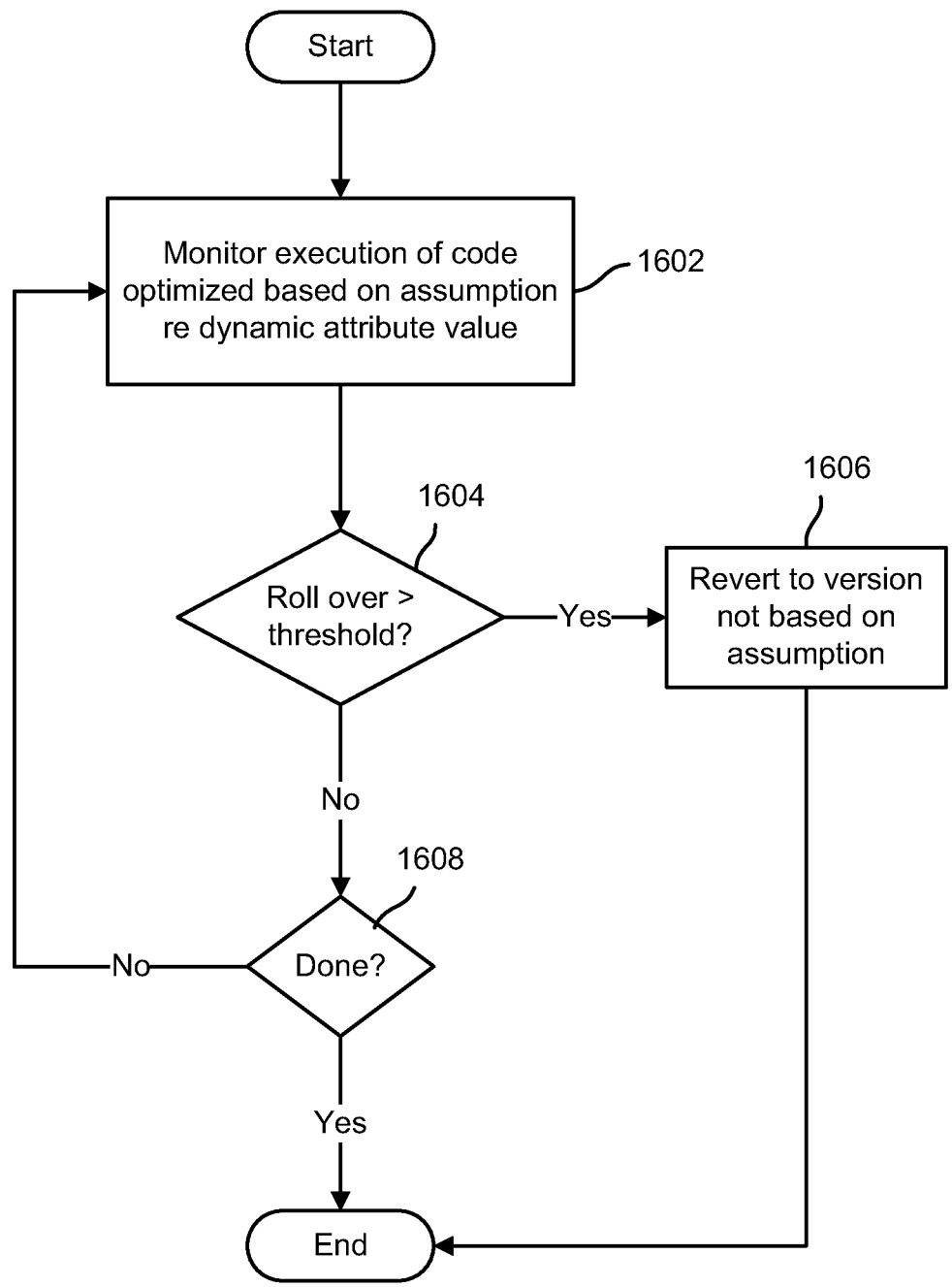
FIG. 16 is a flow diagram illustrating an embodiment of a process for dynamically modifying code and/or an execution path thereof based on observed behavior.

FIG. 16 is a flow diagram illustrating an embodiment of a process for dynamically modifying code and/or an execution path thereof based on observed behavior. In the example shown, execution of code that has been optimized based on an assumption with respect to a value of a dynamic attribute, e.g., as described herein, is monitored (1602) to determine whether the code has rolled over to backup code more than a threshold number of times and/or a threshold rate (instances of rollover/time) due to the assumption having been determined at runtime to not be valid (1604). In some embodiments, the code based on the assumption includes code to increment a counter or other value each time the code rolls over to backup code because the assumption has been found to be not valid. In some embodiments, the code based on the assumption includes code to detect that the threshold has been reached. In some embodiments, a runtime or other environment in which the code based on the assumption is executed tracks the number (and/or rate) of roll over events and/or detects that the threshold has been reached. If the number (and/or rate) of roll over events exceeds the threshold (1604), then a version of the code that is not based on the assumption is reverted to (1606), after which the process ends in the example shown. Otherwise, monitoring continues until done (1608), e.g., the code is no longer executing. In some embodiments (not shown), if code not based on an assumption is reverted to (1606) but the reverted to code is based on one or more other assumptions, then monitoring of roll over events due to those assumptions proving false at runtime continues, until done (1608).

Figure 17:
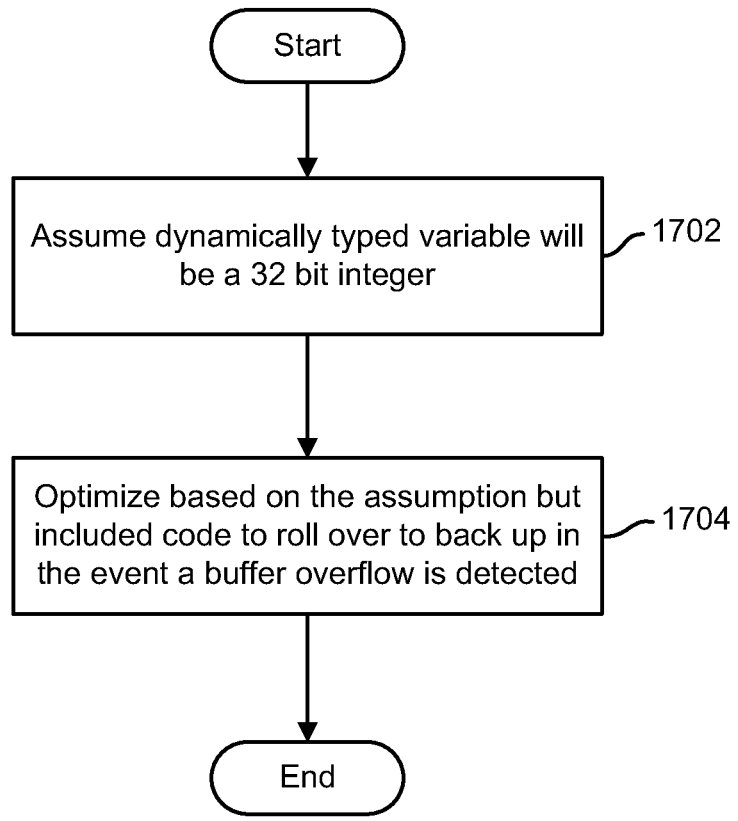
FIG. 17 is a flow diagram illustrating an embodiment of a process for optimizing code.

FIG. 17 is a flow diagram illustrating an embodiment of a process for optimizing code. In the example shown, a dynamically typed variable is assumed to be a 32 bit integer (1702). For example, in JavaScript® the default representation of all variables is as a 64 double floating point number. However, many operations can be performed more efficiently if the assumption that the arguments are 32 integers can be made. In some embodiments, where static analysis and/or dynamic analysis indicate that a JavaScript® variable can be assumed at least initially to be a 32 integer, then the assumption is made (1702). If a JavaScript®, e.g., variable assumed to be a 32 integer at runtime were to turn out not to be a 32 integer, then typically a buffer allocated to store the variable would overflow. In some embodiments, a buffer overflow is monitored for and if detected triggers a roll over to code that is not based on an assumption that the associated variable is a 32 integer. In the example shown in FIG. 17, for example, if an assumption that a JavaScript® or other dynamically typed variable (likely) will be a 32 integer is made, then code that is optimized based on the assumption, and which includes code to roll over to code not based on the assumption in the event of a buffer overflow, is generated (1704). Examples of optimizations based on an assumption that a variable (likely) will be a 32 integer include configuring the code to store the variable as a 32 integer and/or using integer-specific versions of one or more operations, such as "add", in place of more generically applicable but less efficient versions of those operations.

Figure 18:
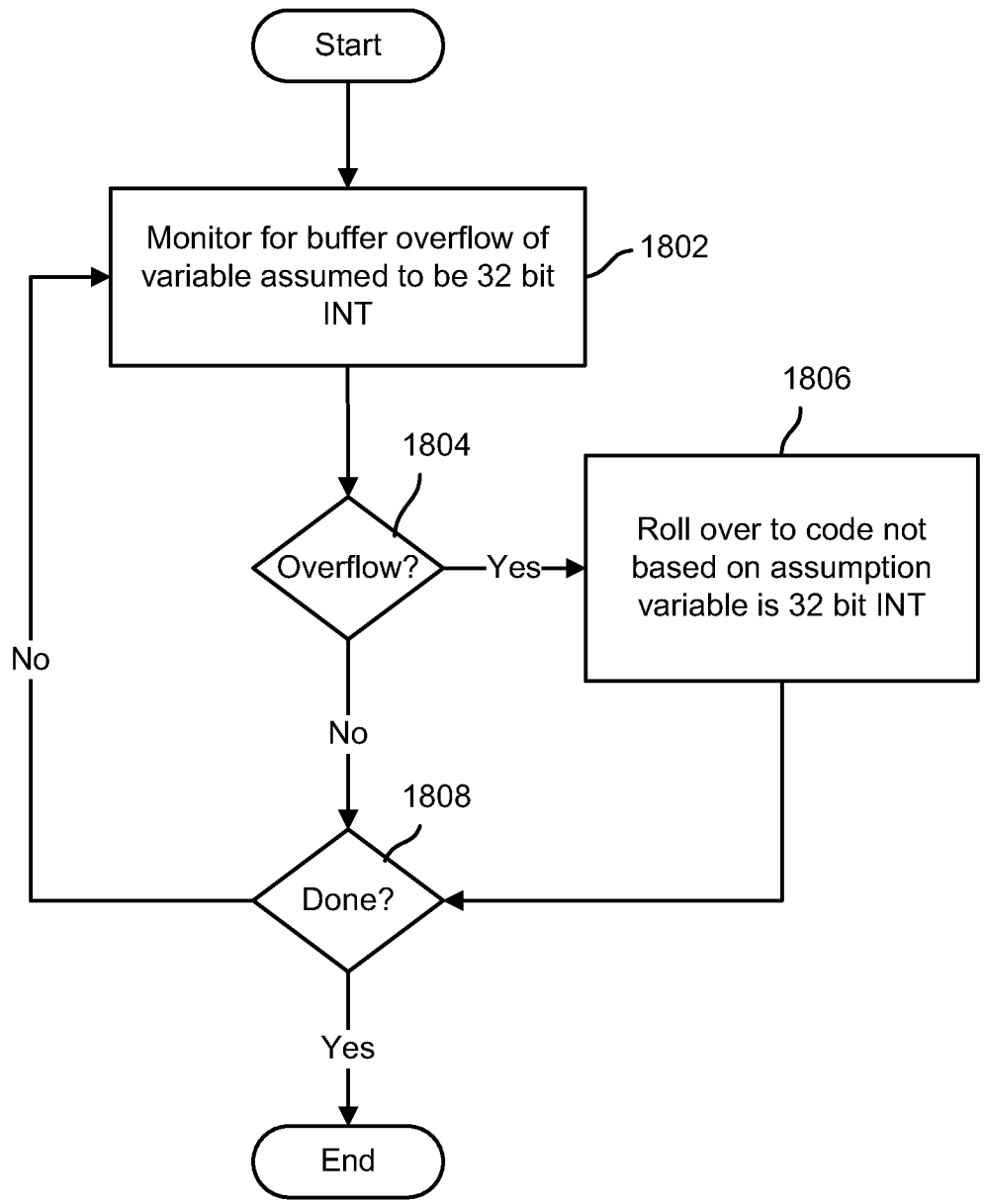
FIG. 18 is a flow diagram illustrating an embodiment of a process for monitoring execution of code.

FIG. 18 is a flow diagram illustrating an embodiment of a process for monitoring execution of code. In the example shown, a buffer in which a variable that has been assumed to be a 32 bit integer is stored is monitored for overflow (1802). In the event of an overflow (1804), a roll over to code not based on an assumption that the variable is a 32 bit integer is performed (1806). Otherwise, monitoring continues until done, e.g., the code is no longer executing and/or the currently executing code is not based on any remaining assumption that a variable is a 32 bit integer (1808).

Figure 19:
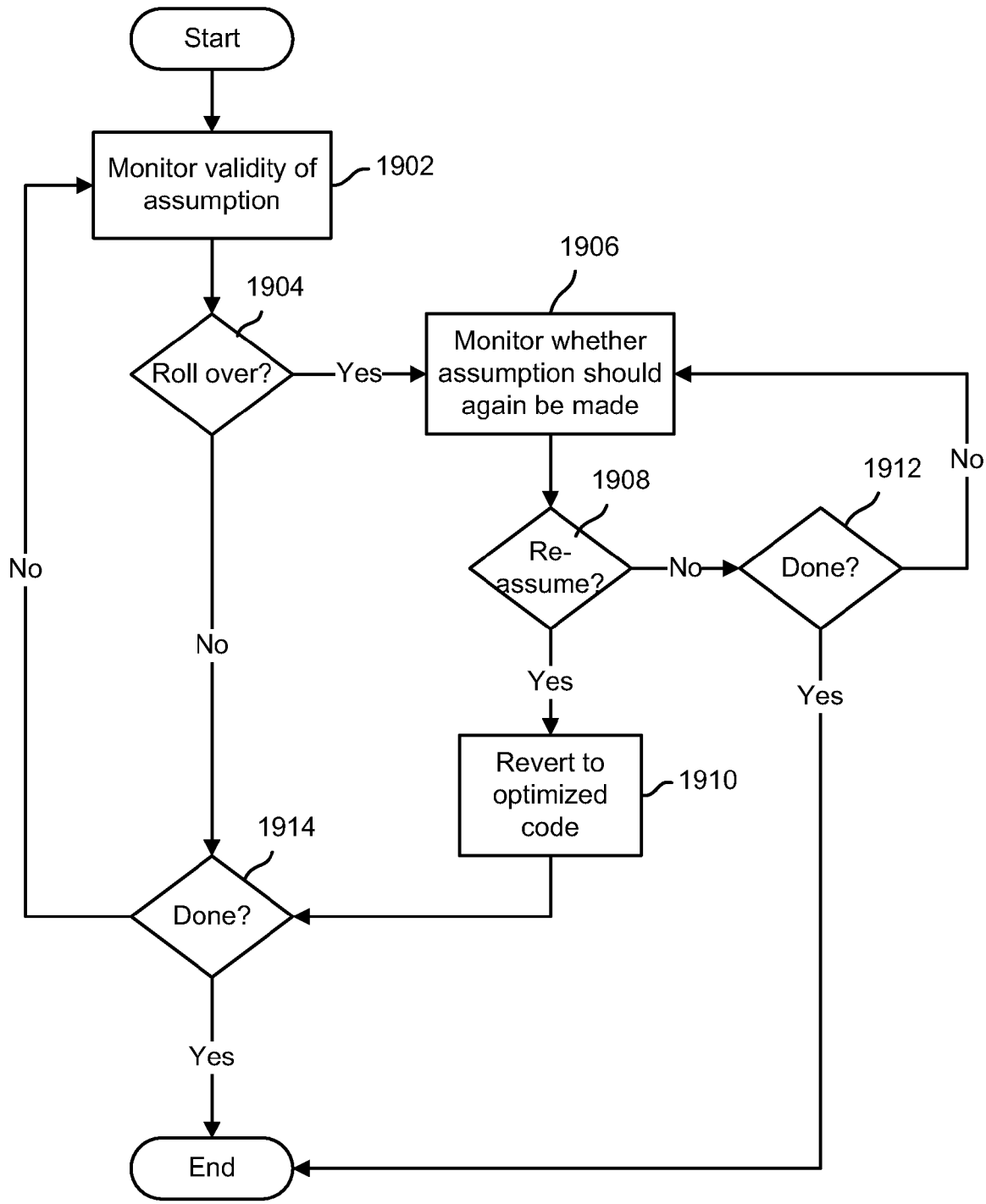
FIG. 19 is a flow diagram illustrating an embodiment of a process for dynamically modifying code and/or an execution path thereof.

FIG. 19 is a flow diagram illustrating an embodiment of a process for dynamically modifying code and/or an execution path thereof. In various embodiments, the process of FIG. 19 is used to execute a roll over to backup code if an assumption based on which code has been optimized is found not to be true in a particular instance, but to then revert to the optimized version of the code in the event conditions indicate that it may again be reasonable and/or increase efficiency to once again make the assumption. In the example shown, the validity of an assumption based on which the monitored code has been optimized is monitored, e.g., tested at runtime prior to execution of a portion of code that has been optimized based on the assumption, as described herein (1902). In the event of a rollover to backup code, e.g., due to the assumption having been found not to be valid in a particular instance (1904), then execution of the backup code to which execution has rolled over is monitored to determine whether the assumption should once again be made (1906). Examples include monitoring a value of a dynamic attribute that had been assumed to have an assumed value but was found in a particular instance to not have that value, resulting in a roll over (1904). If, for example, in more than a threshold number of subsequently observed instances the dynamic attribute were found to have the previously assumed value (1908), then the code that was optimized based on the assumption that the dynamic attribute (likely) would have the assumed value is reverted to (1910). Monitoring for roll over (1902, 1904) and/or to determine whether to revert to code that was optimized based on the assumption (1906, 1908, 1910) continues until done (1912, 1914), e.g., the code stops executing. In some embodiments, each time a roll over occurs subsequent to a first roll over the threshold number of observations of the dynamic attribute having the previously assumed value required to revert to the code optimized based on the assumption increases. In some embodiments, to avoid thrashing a limit is imposed on the number of times the code will revert to the version optimized based on the assumption. For example, in some embodiments after the n-th roll over no reversion to the code based on the assumption is permitted or executed and instead the backup code not based on the assumption continues to execute and monitoring of the value of the dynamic attribute is discontinued. In some embodiments, monitoring and potentially reverting to the code based on the assumption may resume, for example after a prescribed, configured, configurable, and/or dynamically determined wait period.

The techniques described herein enable optimal code to be generated and executed in dynamic environments, including by providing more efficient execution of compiled versions of code provided originally in a dynamically typed and/or otherwise dynamic language such as JavaScript®.

Although the foregoing embodiments have been described in some detail for purposes of clarity of understanding, the invention is not limited to the details provided. There are many alternative ways of implementing the invention. The disclosed embodiments are illustrative and not restrictive.

The invention claimed is:

1. A computer-implemented method for optimizing a manner in which a software code is executed, comprising:
   during a compilation of the software code:
      determining, for a dynamic attribute associated with the software code, an expected value that the dynamic attribute will take on at a runtime of the software code, wherein the software code is dynamically typed, and determining the expected value comprises applying a static type inference analysis to the dynamically typed software code;
      generating an un-optimized version of the software code, wherein the un-optimized version is based on an assumption that the dynamic attribute will not have the expected value;

generating an optimized version of the software code, wherein the optimized version is based on an assumption that the dynamic attribute will have the expected value; and modifying the optimized version to include code that is configured to cause the optimized version during execution to:

transition into executing to the un-optimized version in an event it is determined that the dynamic attribute does not have the expected value, and revert to executing the optimized version subsequent to the transition, in the event it is determined that in at least a threshold number of instances observed subsequent to the transition the dynamic attribute has had the expected value.

2. The method of claim 1, wherein the dynamic attribute comprises a variable type.

3. The method of claim 1, wherein the dynamic attribute comprises a location in memory.

4. The method of claim 1, wherein the dynamic attribute comprises a location in which a global object, property, or variable is stored.

5. The method of claim 1, wherein the dynamic attribute comprises a contents of a global function or method.

6. The method of claim 1, wherein the dynamic attribute comprises a value of a global property or variable.

7. The method of claim 1, wherein the software code comprises un-compiled source code.

8. The method of claim 1, wherein the software code comprises un-compiled source code written in JavaScript®.

9. The method of claim 1, wherein the optimized version of the software code comprises compiled code.

10. The method of claim 1, wherein determining the expected value comprises a static analysis of the software code.

11. The method of claim 1, wherein determining the expected value comprises analyzing statically all or part of the software code to determine the expected value.

12. The method of claim 1, wherein the software code is dynamically typed, and determining the expected value comprises inferring that a variable external to a function has a same variable type as a variable internal to the function.

13. The method of claim 1, wherein the software code is dynamically typed, and determining the expected value comprises inferring that a first variable has a same variable type as a second variable that has been observed during execution of the software code to have had the same value.

14. The method of claim 1, wherein the software code comprises code in a dynamically typed programming language, the dynamic attribute comprises a variable type of a variable, and the method further comprises:

determining that the expected value of the dynamic attribute is a 32 bit integer;

configuring the optimized version to store the variable as a 32 bit integer; and transitioning into executing the un-optimized version in an event a buffer in which the variable is stored overflows.

15. The method of claim 1, wherein reverting to a version of the software code that is not based on the assumption includes executing the version of the software code that is not based on the assumption.

16. A computer system, comprising:
a memory configured to store a software code; and
processor coupled to the memory, and configured to cause the computer system to:
during a compilation of the software code:
determine, for a dynamic attribute associated with the software code, an expected value that the dynamic attribute will take on at a runtime of the software code, wherein the software code is dynamically typed, and determining the expected value comprises applying a static type inference analysis to the dynamically typed software code;

generate an un-optimized version of the software code, wherein the un-optimized version is based on an assumption that the dynamic attribute will not have the expected value;

generate an optimized version of the software code, wherein the optimized version is based on an assumption that the dynamic attribute will have the expected value; and modify the optimized version to include code that is configured to cause the optimized version during execution, to:

transition into executing to the un-optimized version in an event it is determined that the dynamic attribute does not have the expected value, and revert to executing the optimized version subsequent to the transition, in the event it is determined that in at least a threshold number of instances observed subsequent to the transition the dynamic attribute has had the expected value.

17. The system of claim 16, wherein the dynamic attribute comprises one or more of the following: a variable type; a location in memory; a location in which a global object, property, or variable is stored; a contents of a global function or method; and a value of a global property or variable.

18. A non-transitory computer readable storage medium configured to store instructions that, when executed by a processor included in a computing device, cause the computing device to perform steps that include:

during a compilation of a software code:
determining, for a dynamic attribute associated with the software code, an expected value that the dynamic attribute will take on at a runtime of the software code, wherein the software code is dynamically typed, and determining the expected value comprises applying a static type inference analysis to the dynamically typed software code;

generating an un-optimized version of the software code, wherein the un optimized version is based on an assumption that the dynamic attribute will not have the expected value;

generating an optimized version of the software code, wherein the optimized version is based on an assumption that the dynamic attribute will have the expected value; and modifying the optimized version to include code that is configured to cause the optimized version of the software code, during execution, to:

transition into executing to the un-optimized version in an event it is determined that the dynamic attribute does not have the expected value, and revert to executing the optimized version of the code subsequent to the transition, in the event it is determined that in at least a threshold number of instances observed subsequent to the transition the dynamic attribute has had the expected value.

19. The non-transitory computer readable storage medium of claim 18, wherein determining the expected value comprises analyzing statically all or part of the software code to determine the expected value.

20. The non-transitory computer readable storage medium of claim 18, wherein the software code is dynamically typed, and determining the expected value comprises inferring that a variable external to a function has a same variable type as a variable internal to the function.

* * * * *